(12) United States Patent
Schlägl

(10) Patent No.: US 12,544,661 B2
(45) Date of Patent: Feb. 10, 2026

(54) DYNAMIC TRANSITIONING OF A SIMULATING HOST OF A PORTION OR ALL OF A NETWORK INTERACTIVE ENVIRONMENT

(71) Applicant: Build a Rocket Boy Games Ltd., Scotland (GB)

(72) Inventor: Tamás Szilárd Schlägl, Vértesszölös (HU)

(73) Assignee: Build a Rocket Boy Games Ltd., Edinburgh (GB)

( * ) Notice: Subject to any disclaimer, the term of this patent is extended or adjusted under 35 U.S.C. 154(b) by 470 days.

(21) Appl. No.: 18/306,492

(22) Filed: Apr. 25, 2023

(65) Prior Publication Data
US 2023/0338837 A1 Oct. 26, 2023

Related U.S. Application Data

(60) Provisional application No. 63/334,843, filed on Apr. 26, 2022.

(51) Int. Cl.
*A63F 13/358* (2014.01)
*A63F 13/30* (2014.01)
(Continued)

(52) U.S. Cl.
CPC ............ *A63F 13/358* (2014.09); *A63F 13/30* (2014.09); *A63F 13/31* (2014.09); *A63F 13/35* (2014.09);
(Continued)

(58) Field of Classification Search
CPC .... A63F 13/358; A63F 13/352; A63F 13/355; A63F 13/34; A63F 13/77; A63F 13/335;
(Continued)

(56) References Cited

U.S. PATENT DOCUMENTS

| 8,992,328 B2 * | 3/2015 | Kim | A63F 13/352 |
| | | | 463/35 |
| 10,874,943 B2 * | 12/2020 | Fajt | A63F 13/57 |

(Continued)

FOREIGN PATENT DOCUMENTS

| EP | 1494421 A1 | 6/2004 |
| EP | 2045967 A2 | 8/2008 |
| EP | 2722085 A1 | 10/2012 |

OTHER PUBLICATIONS

"What Are Relays Servers for Multiplayer Games? A Peer-to-Peer Networking Guide." 2025. Edgegap. 6 pages. First accessed Sep. 25, 2025. <https://edgegap.com/blog/what-are-relays-servers-for-multiplayer-games-a-peer-to-peer-networking-guide> (Year: 2025).*

(Continued)

*Primary Examiner* — William H McCulloch, Jr.
(74) *Attorney, Agent, or Firm* — SoCal IP Law Group LLP; Jonathan Pearce

(57) ABSTRACT

The present disclosure relates to a system, network architecture and method having a relay server connected through a computer network between an original simulating host and at least two non-simulating hosts engaged in co-activity within the interactive environment. The relay server may be for receiving control information from the original simulating host and the at least two non-simulating host; relaying state information for the interactive environment from the simulating host to the at least two non-simulating hosts; detecting an unavailability of the original simulating host; selecting one of the at least two non-simulating host to become a new simulating host using a selection criteria; transmitting a copy of the state information to the new simulating host; and instructing the new simulating host to begin operating as the new simulating host based on the transmitted state information.

22 Claims, 7 Drawing Sheets

(51) Int. Cl.

| | |
|---|---|
| *A63F 13/31* | (2014.01) |
| *A63F 13/35* | (2014.01) |
| *A63F 13/352* | (2014.01) |
| *A63F 13/355* | (2014.01) |
| *A63F 13/77* | (2014.01) |
| *A63F 13/335* | (2014.01) |
| *A63F 13/34* | (2014.01) |
| *A63F 13/49* | (2014.01) |
| *A63F 13/71* | (2014.01) |

(52) U.S. Cl.
 CPC ......... *A63F 13/352* (2014.09); *A63F 13/355* (2014.09); *A63F 13/77* (2014.09); *A63F 13/335* (2014.09); *A63F 13/34* (2014.09); *A63F 13/49* (2014.09); *A63F 13/71* (2014.09); *A63F 2300/40* (2013.01); *A63F 2300/408* (2013.01); *A63F 2300/513* (2013.01); *A63F 2300/531* (2013.01); *A63F 2300/534* (2013.01); *A63F 2300/5533* (2013.01)

(58) Field of Classification Search
 CPC ......... A63F 13/35; A63F 13/30; A63F 13/31; A63F 13/49; A63F 13/71; A63F 2300/40; A63F 2300/531; A63F 2300/534; A63F 2300/408; A63F 2300/513; A63F 2300/5533
 See application file for complete search history.

(56) References Cited

U.S. PATENT DOCUMENTS

| | | | | |
|---|---|---|---|---|
| 10,967,259 | B1* | 4/2021 | Berg | A63F 13/352 |
| 11,122,307 | B2* | 9/2021 | Wu | H04N 21/4126 |
| 11,123,633 | B2* | 9/2021 | Lee | A63F 13/30 |
| 11,146,661 | B2* | 10/2021 | Fajt | G06F 3/017 |
| 11,161,039 | B2* | 11/2021 | Nakata | A63F 13/34 |
| 11,471,775 | B2* | 10/2022 | Benzies | A63F 13/23 |
| 11,478,700 | B2* | 10/2022 | Berg | A63F 13/352 |
| 11,606,423 | B2* | 3/2023 | Wu | A63F 13/42 |
| 11,875,471 | B1* | 1/2024 | Benzies | G06T 19/20 |
| 11,983,816 | B1* | 5/2024 | Benzies | G06T 17/20 |
| 11,995,787 | B2* | 5/2024 | Loclair | H04N 21/4722 |
| 12,157,060 | B2* | 12/2024 | Benzies | A63F 13/87 |
| 12,257,509 | B2* | 3/2025 | Benzies | A63F 13/60 |
| 12,285,689 | B2* | 4/2025 | Yang | A63F 13/86 |
| 12,323,644 | B2* | 6/2025 | Otsuka | H04N 19/167 |
| 2012/0102185 | A1* | 4/2012 | Fernandes | A63F 13/358 |
| | | | | 709/224 |
| 2013/0059656 | A1* | 3/2013 | Kim | A63F 13/79 |
| | | | | 463/29 |
| 2013/0185408 | A1 | 7/2013 | Ngo | |
| 2014/0235356 | A1* | 8/2014 | Yamane | G07F 17/3276 |
| | | | | 463/42 |
| 2014/0359120 | A1* | 12/2014 | Jung | A63F 13/75 |
| | | | | 709/224 |
| 2019/0297360 | A1* | 9/2019 | Wu | H04N 21/4402 |
| 2019/0379765 | A1* | 12/2019 | Fajt | A63F 13/55 |
| 2020/0122030 | A1* | 4/2020 | Nakata | H04W 4/08 |
| 2020/0254339 | A1* | 8/2020 | Lee | A63F 13/30 |
| 2021/0129019 | A1 | 5/2021 | Colenbrander | |
| 2021/0297478 | A1* | 9/2021 | Wu | A63F 13/77 |
| 2022/0291742 | A1* | 9/2022 | Otsuka | G09G 5/36 |
| 2022/0353555 | A1* | 11/2022 | Otsuka | H04N 21/4402 |
| 2023/0013365 | A1* | 1/2023 | Chiba | G06Q 50/10 |
| 2023/0233945 | A1* | 7/2023 | Yang | A63F 13/86 |
| | | | | 463/42 |
| 2023/0338837 | A1* | 10/2023 | Schlägl | A63F 13/352 |
| 2024/0013495 | A1* | 1/2024 | Loclair | A63F 13/61 |

OTHER PUBLICATIONS

"What is a Relay Server?—Resilio Sync." 2025. Resilio, Inc. 3 pages. First accessed Sep. 25, 2025. <https://help.resilio.com/hc/en-us/articles/204754779-What-is-a-Relay-Server> (Year: 2025).*

European Union Intellectual Property Office, European Search Report for Application No. 23170007.1, mail date Sep. 22, 2023, 11 total pages.

* cited by examiner

DYNAMIC TRANSITIONING OF A SIMULATING HOST OF A PORTION OR ALL OF A NETWORK INTERACTIVE ENVIRONMENT

RELATED APPLICATION INFORMATION

This patent claims priority from U.S. provisional patent application No. 63/334,843 entitled "DYNAMIC TRANSITIONING NETWORK ARCHITECTURE FOR LARGE-SCALE NETWORK INTERACTIVE ENVIRONMENTS" filed Apr. 26, 2022, the entire content of which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to interactive environments and, more particularly, to dynamic transitioning of network architectures such as of a simulating host of a portion or all of an interactive environment for security, speed, and various purposes dependent upon interactive environment needs.

Description of the Related Art

There have existed various network architectures for multiplayer interactive environments for many years. Multiplayer games began as asynchronous games, where player moves were transmitted intermittently as each player's computer became available on a network (e.g. dialed-in to a modem). These types of games were commonly chess-style games where each player takes a turn before the other player takes a turn. These games gave way to MUD-style (multi-user dungeon) games where many users could be interacting with an environment at the same time. These games eventually gave way to massively-multiplayer online role playing games (MMORPG) such as EVERQUEST® or World of Warcraft® or SECOND LIFE®.

Somewhat unrelated to these asynchronous games or the MUD-style games, a revolution began in gaming with the advent of the first true three-dimensional rendering add-on cards. These have over time become graphics processing units (GPUs). This transition began with games such as DOOM® or WOLFENSTIEN® as single-player fast-paced three-dimensional environments, typically in the form of an FPS (first-person shooter) game. These games eventually gave way to local area network games reliant upon the same engines to enable players to take part in a competitive game environment with their friends in a home, dorm, or generally within the same "local area" network. This was because a high-speed network connection was required for the fast-paced gameplay to perform appropriately.

SUMMARY

According to a first aspect of the invention, there is provided a network architecture for an interactive environment, the network architecture comprising a relay server configured to be connected through a computer network between an original simulating host and at least two non-simulating hosts engaged in co-activity within the interactive environment, the relay server being configured to receive control information from the original simulating host and the at least two non-simulating host relay state information for the interactive environment from the simulating host to the at least two non-simulating hosts detect an unavailability of the original simulating host select one of the at least two non-simulating host to become a new simulating host using a selection criteria transmit a copy of a state information to the new simulating host; and instruct the new simulating host to begin operating as the new simulating host based on the transmitted state information.

In an embodiment, the network architecture further comprising the new simulating host, the new simulating host configured to simulate the interactive environment based on the control information and the state information store and update the state information based on the interactive environment and communicate state messages having the state information to the relay server for the relay server to update any connected non-simulating host with changes of status to the interactive environment.

In an embodiment, the simulating host is configured to simulate a portion or all of the interactive environment and wherein the network architecture further comprises the non-simulating hosts, each non-simulating host is further configured to receive the state information from the relay server and update the interactive environment, as shown on a display associated with each non-simulating host to correspond to the changes in the state information.

In an embodiment, the unavailability of the original host is a selected one of: the original host disconnected from the at least two non-simulating hosts, a selected interactive environment, experience or game type requires different host parameters than the original host can provide, the original host has left the interactive environment, and the original host has selected to engage in a different experience type than at least one of the at least two non-simulating hosts.

The network architecture for an interactive environment of any one of the preceding claims wherein the state information includes at least two of character data, weapons data, and location data.

In an embodiment, the relay server is further configured in that the selection criteria for a non-simulating host candidate to become the new simulating host includes a selected one or more of: CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

In an embodiment, the relay server is configured to: select the new simulating host based on at least two of the selection criteria.

In an embodiment, each of the at least two non-simulating host is configured to receive and store a sub-portion of the state information for the interactive environment on a periodic basis obtained through the relay server from the simulating host; and wherein the relay server is further configured to combine each sub-portion of the state information stored by each of the at least two non-simulating host to recreate the state information for the interactive environment in the event that the simulating host becomes unavailable.

In an embodiment, the relay server is further configured to: upon selecting one of the at least two non-simulating host to become a new simulating host, request copies of each sub-portion of the state information stored by each of the at least two non-simulating host; transmit the copies of each sub-portion of the state information to the new simulating host; and instruct the new simulating host to recreate the state information and to begin operating as the new simulating host.

In an embodiment, the relay server is further configured to: detect the unavailability by determining that no state message has been received for a threshold period of time; upon detecting the unavailability, send messages to the at least two non-simulating hosts of the unavailability of the simulating host; and upon selecting the new simulating host, send messages to the at least two non-simulating hosts identifying the selected new simulating host.

In an embodiment, the new simulated host is a client computer or a server computer, and wherein the new simulated host is configured to: store and update the state information for the interactive environment; communicate state messages having the state information to the relay server for the relay server to update the at least two non-simulating host with the changes of status to the interactive environment.

In an embodiment, the relay server is further configured to: receive and store periodic updates of the state information from the original simulating host; and buffer and send to the new simulating host, any state messages that were unacknowledged as received by the original simulating host.

In an embodiment, the relay server is configured to be connected through a computer network to the original simulating host and at least two non-simulating hosts before detecting an unavailability of the original simulating host, and is connected through the computer network to the new simulating host and the at least two non-simulating hosts after instructing the new simulating host; and wherein the original simulating host and the new simulating host are each configured to act as a network controller managing communication between the relay server and the non-simulating hosts.

In an embodiment, the relay server is further configured in that the instructing the new simulating host comprises instructing the new simulating host to: simulate the interactive environment based on the control information; store and update the state information based on changes to the interactive environment; communicate state messages having the state information to the relay server for the relay server to update the at least two non-simulating host with the changes of status to the interactive environment.

In an embodiment, the relay server is hosted by a game or experience provider; the original simulating host is a host player-operated client computer serving as a server; the non-simulating hosts are non-simulating client computers participating in the game or experience and connected, via the relay server, to the host client computer; the original simulating host is configured to handle all game logic, including simulating in-game avatar movement, health, shooting, and actions; and wherein the relay server is further configured to, by default, if the original simulating host disconnects, the interactive environment will end for all connected non-simulating hosts as well when the state information is not shared by the relay server or the non-simulating client computers.

In an embodiment, the network architecture includes an apparatus having a non-transitory machine readable medium storing a program having instructions which when executed by a processor will cause the processor to dynamically transition a simulating host of a portion or all of network interactive environments as claimed in any one of the preceding claims.

According to a second aspect of the invention, there is provided a relay server for dynamic transitioning from an original to a new simulating host of an interactive environment, wherein the relay server is configured to connect through a computer network between the original simulating host and at least two non-simulating hosts engaged in co-activity within the interactive environment receive user input control information from the at least two non-simulating host send the received user input control information to the original simulating host receive state messages having the state information having changes of status to the interactive environment from the original simulating host based on the user input control information from the at least two non-simulating host and user input control information of the original simulating host update the at least two non-simulating hosts with the state messages detect an unavailability of the original simulating host select one of the at least two non-simulating host to become a new simulating host based on at least three selection criteria transmit the state information to the new simulating host; and instruct the new simulating host to begin operating as the new simulating host based on the transmitted state information.

In an embodiment, the selection criteria include: CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

In an embodiment, the relay server is configured in that the instructing the new simulating host comprises instructing the new simulating host to simulate the interactive environment based on the user input control information from the at least two non-simulating host and user input control information of the new simulating host, from the new simulating host store and update the state information based on the interactive environment communicate state messages having the state information to the relay server for the relay server to update the at least two non-simulating host with the changes of status to the interactive environment.

In an embodiment, the relay server is configured to be part of a network architecture further comprising the original simulating host configured to simulate a portion or all of the interactive environment based on the control information store and update the state information based on the interactive environment communicate state messages having the state information to the relay server for the relay server to update the at least two non-simulating host with the changes of status to the interactive environment the at least two non-simulating host configured to receive the state messages from the relay server and update the interactive environment, as shown on a display associated with the at least two non-simulating host to correspond to the changes of status.

According to a third aspect of the invention, there is provided a method for operation of a relay server for dynamic transitioning from an original to a new simulating host of an interactive environment, the method for the relay server comprising connecting through a computer network to the original simulating host and at least two non-simulating hosts engaged in co-activity within the interactive environment receiving user input control information from the at least two non-simulating host sending the received user input control information to the original simulating host receiving state messages having the state information having changes of status to the interactive environment from the original simulating host based on the user input control information from the at least two non-simulating host and user input control information of the original simulating host updating the at least two non-simulating hosts with the state messages detecting an unavailability of the original simulating host selecting one of the at least two non-simulating host to become a new simulating host transmitting the state information to the new simulating host and instructing the new simulating host to begin operating as the new simulating host based on the transmitted state information.

In an embodiment, the method further comprising selection of the new simulating host based upon at least one selection criteria for a candidate new simulating host selected from the group CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

According to a fourth aspect of the invention, there is provided a network architecture for an interactive environment wherein the network architecture includes a relay server having a non-transitory machine readable medium storing a program having instructions which when executed by a processor will cause the processor to perform the method of the third aspect of the invention.

With the relay server according to the second aspect, the method according to the third aspect and the network architecture according to the fourth aspect, the same or similar embodiments may be provided as with the network architecture according to the first aspect. With the relay server according to the second aspect, the method according to the third aspect and the network architecture according to the fourth aspect, as well as the embodiments thereof, the same or similar effects may be achieved as with the network architecture according to the first aspect.

Figure 1A:
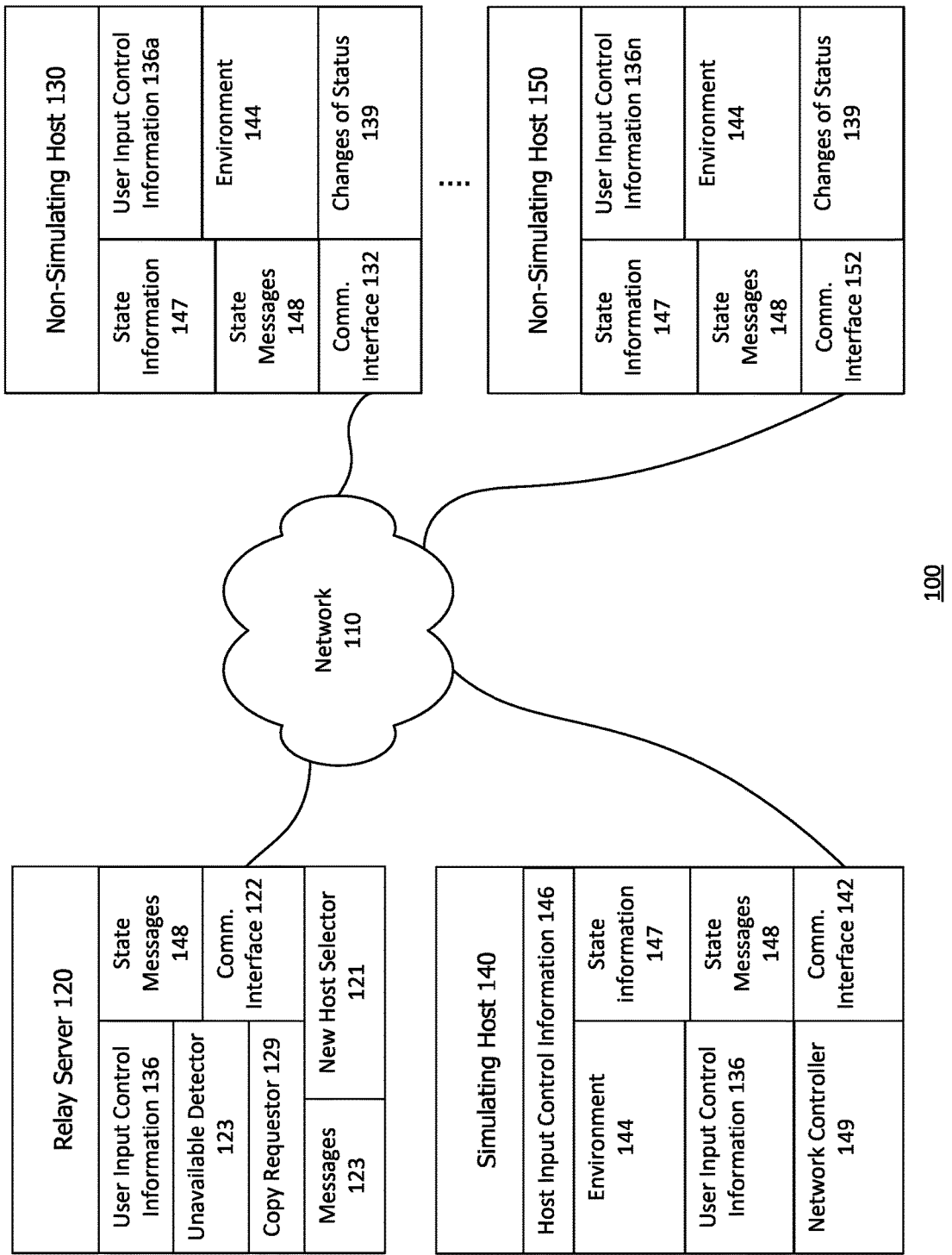
FIG. 1A is a block diagram of a system for dynamic transitioning of a simulating host of a portion or all of network interactive environments, showing an original simulating host.

Throughout this description, elements appearing in figures are assigned three-digit reference designators, where the most significant digit is the figure number, such as where the element is first introduced, and the two least significant digits are specific to the element. An element that is not described in conjunction with a figure may be presumed to have the same characteristics and function as a previously-described element having a reference designator with the same least significant digits.

DETAILED DESCRIPTION

As the internet infrastructure evolved to provide faster internet to homes and businesses around the world, these games evolved to enable user-hosted games or server-hosted games which could merely be joined by anyone or by one's friends. Systems likewise evolved to enable player to pick the "closest" or fastest servers (e.g. those with the lowest "ping") upon which to play because low-latency is important for a quality multiplayer FPS experience (e.g., environment). The earliest very popular example of such a game was COUNTER-STRIKE®. Counter-Strike servers could be hosted by Valve® itself or by individuals in dorms, their homes, online or otherwise. The servers are then listed in large databases of available servers and may be joined by anyone—in most cases—or only by a select few individuals with a password or other protection.

However, as user-hosted servers proliferated, the players noticed that there existed a strong incentive for players to cheat. Various modifications (mods) for Counter-Strike became available. For example, some made entire levels transparent or translucent so that players could always know where other players were. Others modified the responsive commands sent by their computer to always indicate a "hit" of a player or always to indicate a "headshot" of a player when firing a weapon. In response, Valve, Counter-Strike's then-owner implemented anti-cheat software that checked the file format and content of game files, noted any changes to the server and enabled auto-kick (e.g. remove from server) features for players found to have modified game code or graphics content.

In a perpetual cat-and-mouse game with cheaters, ways were found to circumvent this software, the anti-cheat software was updated to address those issues, and so on into the future. These types of games (e.g. multiplayer, FPS games) are still wildly popular. Modern iterations include FORTNITE®, APEX LEGENDS®, or the BATTLEFIELD® series of games. There are numerous others. Each of those games have had to deal with how best to ensure low latency, avoid cheating, and provide sufficient coverage for games.

The strongest way to avoid cheating and to provide low-latency servers for any multiplayer FPS style game is to pay for and run high-quality, nearby servers for all major regions. So, a given game company may elect to design its network infrastructure model for such a game by paying a hosting service to provide a dedicated server or servers in each major metropolitan area throughout the major game-playing regions (e.g. the U.S., EU, Japan, Korea, etc.). By operating the servers themselves, the company can ensure both a low latency for most major cities and regions and that the server infrastructure is secure and relatively free from cheating. It is easier to detect cheating if only one player is cheating and the server files themselves have not been modified. The server, operated by a game company, can be the ultimate arbiter of any network decision (e.g. did a player actually shoot another player).

The significant downside to self-hosting is cost. To pay for those servers, throughout the world, and the upkeep of the server infrastructure worldwide is not free. There are salaries associated with the network and server administrators. The servers must be kept up virtually constantly. And, issues (e.g. server downtime, server problems, etc.) all fall upon the company. Even the costs of the servers themselves, the high amount of bandwidth used by those types of servers, and the so-called "high availability" of the servers impose significant costs. The associated game or environment must be quite profitable to merit such a roll-out. Smaller game companies often cannot afford the associated costs.

Those types of companies rely upon third-party anti-cheat software and often fallback to self-hosted servers such as were available in the Counter-Strike era. This spreads out the costs and hassle of hosting large numbers of servers, and enables communities themselves to host nearby servers for players that may, in fact, simply be the player's own computers. The game or environment spreads somewhat virally, as players add servers to be available for themselves and their friends at virtually no cost to the game company or developer. The major drawback is a lack of quality control and control in general. Player experience, particularly for new players, may be compromised. Cheating is much harder to stop.

Another game type has evolved into a great deal of popularity over the last several years. This game type is called a MOBA. It shares many attributes with an FPS game. Latency is important, between 4 and 20 players play on a given game at a time (typical is 5v5), but it is much less graphically intense. Cheating is rampant unless game conditions are carefully controlled, but the overall server load is much less than an FPS-style game because game assets other than players are typically smaller, simpler, and fixed. Still, many of the same problems and solutions arise.

At another end of the spectrum are experiences (e.g., or environments) like SECOND LIFE®, ROBLOX® or Meta's upcoming metaverse of varied user experiences. In these experiences, there can be gameplay in the traditional sense, but the games in their baseline are essentially online places to "hang out" and to spend time with friends, typically in the guise of a virtual avatar. There may be relatively rudimentary features implemented such as localized audio or speech such that players near a player avatar can "hear" or "see" voice or text chat being transmitted by another player nearby. Players may be able to visually see other players in the environment, and there may be locations such as virtual stores, homes, and transportation devices (e.g. horses, cars, motorbikes, etc.).

However, these environments differ significantly in that none of the players (generally) are engaged in activities that require rapid server response or low latency. No player is "shooting" another player. If a player's text chat is a half a second later than it was typed, nothing dramatic changes for any player avatar. There is little incentive or desire to "cheat" and it may not even be clear what cheating would entail. Sometimes within these environments, particularly for example with ROBLOX® there are "games" within the game in a more traditional sense. Even then, they are generally of a form more akin to "party games" where people already hanging out within the environment engage in activities within that environment. If cheating were to happen, no one is particularly upset, or they are doing it as a part of the "hang" to have fun with their friends.

There exist any number of "games" or experiences in between the two extremes of "hangout" sessions and FPS-style sessions or MMORPGs. Each adopts a network infrastructure based upon any number of factors, selection criteria or metrics including, needed latency, money available for hosting servers, the monetization system associated with the experiences, the desire and likelihood of cheating and its effect, if any, the need for fast response times for player activity, whether or not competitive events are occurring, any monetary or prestigious rewards available for high-level or competitive play, whether real-money rewards or substantive in-game rewards are available for high-level play, and other characteristics.

However, most "games" or experiences in a two- or three-dimensional virtual environment tailor the network infrastructure to the needs of that particular game or experience. For a "hang out" game such as ROBLOX® there is almost no need for numerous, dedicated servers, with careful cheat detection, throughout the world, and with extremely low latency. Because there is significant cost associated with using such servers, ROBLOX® does not use those kinds of servers. In contrast, APEX LEGENDS® requires low latency, strong anti-cheat measures in part because there is a strong competitive element to the game, it is fast-paced, and there are eventual monetary rewards and prestige rewards for engaging in high-level play or competition in APEX LEGENDS®.

These games or experiences almost exclusively offer a single experience. Games or experiences rarely transition from solo play where there is no competition or incentive to cheat and no latency testing is required to one which relies upon a highly competitive, low latency environment, and then to a "hang out" mode where cheating is irrelevant. Games generally stay in a particular lane or category, offering only that one, singular experience. One game offers a bit of two experience types—DIABLO III®.

Diablo III involved single player, multiplayer and, at launch, a real-money auction house for items. People could spend real money for in-game items. As a result, there would be literal monetary incentive for a player to game the system and "cheat" to obtain certain items in order to sell them on the auction house for real money. In response, BLIZZARD®, the creator of Diablo III, enabled an "always online" functionality. No player could play Diablo III in any form without signing into Blizzard's servers, even if that player were merely playing alone. This was done primarily as a security measure to ensure the integrity of the real-money auction house. So, even though Diablo III offered a single player experience and a multiplayer experience potentially with different network requirements, Blizzard chose to enforce the strictest security and latency requirements in order to ensure overall integrity of their systems. The major downside is that Blizzard must keep a secure, server infrastructure operating at all times, even for players who simply wish to play alone and for which latency and security are somewhat irrelevant.

The metaverse alters this traditional dynamic of selecting a network architecture to match the necessary speed, security, and other requirements to a given game or experience.

The metaverse is, by its nature, a diverse set of differing user experiences. There will be "hangout" sessions, there will be FPS-style sessions, there will be MMORPGs, there will be asynchronous chess games. All of these experiences will be interconnected into one metaverse. There are various in-game metaphors for the potential transitions between these experiences (e.g. portals, launching a game on a virtual console within a virtual environment, walking into a different space through a door, or still others). But, a user will be able to transition almost at will from a "hang out" to a first person shooter, or to a chess game.

It would be hugely inefficient and expensive to constantly demand the lowest latency and the highest security for all users at all times in such a metaverse in order to address the small number of people who are presently engaged in activities requiring such latency and security requirements. To do so would require a massive number of hosted servers spread throughout the world. Logins would necessarily be secure, and the infrastructure prices would be extreme. What's worse, most of the "hang out" experiences are typically offered to users for free so there would be no monetization backend supporting the cost for these high-availability servers.

It is preferable to be able to dynamically transition between network architectures on an as-needed basis.

For metaverse computer generated environments (e.g., interactive environments, games, or similar interactive experiences), such as those with "hangout" sessions, FPS-style sessions, MMORPGs, game sessions, and the like, it is preferable to be able to dynamically transition between network architectures on an as-needed basis. For hangouts, the experience could be self-hosted by one or more participants. Game or environment states could be spread across multiple users simultaneously to enable a single player drop to have minimal effect. And, the network security and speed requirements could dynamically altered based upon a transition between experience types. In this way, only the games or experiences having strict requirements would demand dedicated servers or infrastructure and costs could be minimized while providing a high-quality experience for all participants in the metaverse.

It would also be beneficial to dynamically be able to transition between self-hosted or user-hosted modes and server-hosted modes. In some cases, self-hosting of certain experience types or game types may not be feasible, preferrable, or provide a good user experience. For example, self-hosting may enable cheating, provide poor latency and thus make experience appear to stutter or otherwise embody "lag" in user interactions. Self-hosting may interject longer distances between players (e.g. if a self-hosted computer is selected that is far from the other players). However, server-hosted modes cost real money to metaverse, game or other experience operators in requiring payment for high-availability or high-capacity server infrastructure to provide better bandwidth, latency, more capable CPUs and RAM, and to offer more security or enable anti-cheat technology. It may be desirable to offer both options, dependent upon the type of game or experience taking place, and to enable transition between these two options in as seamless a manner as possible. But, handling the transition for a smooth handoff between modes may be difficult.

Described herein is technology to dynamically transition network architectures, such as a simulating host of a portion or all of an interactive environment, for security, speed, capability, and various purposes dependent upon interactive environment needs. For example, the technology can be a system, computing device, relay server, method, computer hardware and/or computer software that dynamically transitions simulating hosts of a portion or all of network interactive environments such as computer games.

The baseline technology may include a relay server, hosted by a game or experience provider, at least one simulating host (e.g., e.g., one or more simulating servers and/or simulating clients) and at least one or at least two non-simulating clients. The simulating host is a player-operated computer serving as a server. The non-simulating client is a client participating in the game or experience and connected, via the relay server, to the simulating client. The simulating client handles all game logic, including simulating the in-game avatar movement, health, shooting, actions, etc. By default, if the simulating client disconnects, the game will end for all connected non-simulating clients as well because the state is not shared by the server or the non-simulating clients.

By transitioning the typical server responsibilities in the server-client infrastructure to merely a relay server, most of the load of enabling these services is offloaded to one of the clients. As a result, the relay server may serve many more clients than a typical server-client model server.

The proposed technology may include configurable distribution of game server responsibility. Server responsibility can be offloaded to a single client or may be spread among multiple clients. Or, when needed, server responsibility may be given to a purpose-made actual server. A given "area" within a game or environment may be instanced or sharded for a local geographic space. So, clients in that area may have responsibility handled by and be connected to a nearby client acting as the simulating client while others in a different geographic area may be connected to another simulating client, while still in the same in-game or in-environment location. Each simulating client may be connected to non-simulated client through a relay server.

The simulating host may be understood as the host that has been instructed by the relay server to operate as the simulating host based on the transmitted state information. The non-simulating hosts may be understood as the remainder of the hosts.

Throughout the present document, the term network architecture may be understood as a computing system, e.g. a computing system that is configured to implement the described architecture in which roles are assigned to the hosts. The computing system comprises the relay server which connects to the hosts and assigns the specified actions to the hosts. The network architecture, i.e. the computing system comprises the relay server. The network architecture may further comprise the plurality of hosts. The plurality of hosts may comprise a simulating host and at least two non-simulating hosts. The plurality of hosts and the relay server are configured to be connected through a computer network, such as the internet.

The term original simulating host may be understood as the host that has been instructed by the relay server to be the simulating host and acts as the simulating host when the process of selecting a new simulating host begins. It is a subsequent process that may be repeated any number of times as the game/experience proceeds.

The simulating hosts and non-simulating hosts may be user devices, e.g. computers, of the "users" of the system. Power consumption and maintenance of servers may be offloaded to the user devices. Accordingly, the non-simulating hosts and the (original) simulating host may both be a part of the network architecture.

The present invention enables to spread an overall (data processing, such as of a game or experience) load across multiple hosts and, therefore, in the event a single simulating host or even a group of simulating hosts would go down or become unavailable, another one or more of the hosts may be selected and instructed to be the simulating host. Thus, the game or experience provided to the hosts may persist and/or recover. The state information for subsets of the game or experience may be spread about multiple simulating and non-simulating hosts, enabling to recover the state information from one or more available hosts.

Processing for clients and in-game components may be split between different connected users simultaneously. So, portions of the game may be managed by one connected simulating client, while other portions may be handled by another. In addition, the relay server may act as a data broker to maintain an active state and to arbitrate issues in the case of a disagreement between simulating clients or a disconnected (e.g., unavailable) simulating client.

One way to handle this issue is to distribute the game state data across multiple clients. A single client can be responsible for being the host, but then the way to transition seamlessly from the replicating client to another non-replicating client to act as the replicating client is called host migration (e.g., host transition). It may be preferrable to distribute the state data or merely to have a ready periodic back up of the state data for all accounts on at least one additional client or server. This ensures cohesive determinism of the state data in the event one replicating client drops unexpectedly.

Relatedly, the simulating client may also act as a network controller managing the communications between the relay server and the non-simulating clients. The system will dynamically migrate the network controller functionality as well as the overall game state to ensure a smooth transition as the replicating/simulating client leaves or disconnects unexpectedly.

Instancing and spatial partitioning (e.g., co-existence in the same virtual space, but not on the same server) can also be addressed by the same infrastructure systems that perform load balancing and ensure consistency across multiple sets of relay server, simulating client(s) and non-simulating clients. In addition, the game or experience components may be distributed as well. So, certain groups of the clients may be responsible for certain portions of the in-game components, while other clients may be responsible for others. Smoothly transitioning in the case of an unexpected simulating client drop may require continuous updating of at least portions of the experience state across clients and/or a server.

As noted above, technology herein can be a system, computing device, relay server, method, computer hardware and/or computer software that dynamically transitions or migrates simulating hosts of a portion or all of network interactive environments such as computer games. To engage in this host migration in an organized and dynamic way, various system integrations should take place and be maintained throughout a given player's connection to the game or experience. In the past, systems have relied upon a multiplayer game simply crashing when a hosting user crashes or disconnects. Or, there can be a process of "pausing" the game state in order to transition control to another client operating as a server. More modern systems rely upon a seamless host migration that enables the play experience to continue (e.g., not crash or pause) as the game state data is passed.

Detecting the need for some host migration transitions may be difficult and may take time. For example, consider the following scenario:

4 clients join a game, client 1 is the Simulating Client, clients 2, 3 and 4 are Replicating Clients.

Client 1 suffers a crash. It will take the Relay Server some time, say, 1 or 2 seconds to determine that Client 1 is truly dead. The relay sever may wait a threshold time window of determination long enough to avoid a false positive determination.

The Relay Server now needs to elect a new Simulating Client and effect the transfer. The remaining clients need to be informed.

Any remote procedure calls (RPCs) or Messages that were in flight between the clients and relay server prior to the newly elected Simulating Client taking control will be lost or potentially need to be buffered, adjusted and re-issued to the new host.

The technology may operate to effectively pause a game or experience to enable host migration. Relevant game state data (e.g., state information and/or state messages) may be handed to the new simulating client, as instructed by the existing simulating client or the relay server. Once the process is complete, the game or experience may be resumed by the new simulating client.

As an alternative strategy, a seamless host migration may take place by having overlapping state data spread across multiple machines, with a single simulating client being responsible for operating the game. In the event of an unexpected transition, the data missing from a new simulating server may be requested and obtained from the other non-simulating clients, then transmitted to the new simulating client. In another case, the server may maintain a backup copy of part or all of the state data. A pause may be required or, depending on the game or experience type. The pause may be handled relatively seamlessly or entirely seamlessly from the perspective of a given player.

A seamless host migration may be one without a noticeable pause to the users or non-simulating hosts. As the name suggests, seamless host migration may be when host migration occurs without any visible or detrimental effects on the game and the player experience. A seamless host migration may enable the play experience to continue (e.g., not crash or pause) because the game state data is quickly passed to another simulating host. A seamless host migration may be much, much harder to implement than a synchronous host migration where there is a noticeable pause to the users or non-simulating hosts during host migration. A synchronous host migration may be when during host migration there is essentially a "pause" in the game or a display of some kind of overlay, and a period of time is taken (usually several seconds) to determine the new host. At this point, there may also be a countdown timer that all clients use to synchronize and then resume the game. This can be considered a somewhat heavy handed approach to host migration but it's obvious when it happens and requires a lot less work to try to get right.

The simulating host transition may occur during a gameplay experience wherein a user may engage in any number of distinct gameplay or experiences (e.g., co-activity) while within or a part of an overall interactive game environment. The user gameplay experience may occur using or on a client computing device, such as a PC, a laptop, a gaming console, a virtual VR headset, a mobile phone, a smart phone, a tablet computer, or other gameplay device. Here, one or more player avatars of the simulating client and other non-simulating clients may engage in the interactive environment.

Description of Apparatus

Referring now to FIG. 1A, an overview of a system 100 for dynamic transitioning of a simulating host of a portion or all of network interactive environments is shown. The system 100 includes a relay server 120, an original simulating host(s) 140 and non-simulating hosts 130-150; all interconnected by a network 110. System 100, relay server 120, simulating host(s) 140 and non-simulating hosts 130-150 being "for" doing an action may mean that they are configured to and/or adapted to perform that action such as for dynamic transitioning of a simulating host of a portion or all of network interactive environments. System 100 may be a network architecture for an interactive environment 144.

Network 110 may be a wired and/or wireless network. It may include a local area network (LAN), cell network, WIFI, Bluetooth®, the Internet or a combination thereof. Network 110 may be a network that can be used to communicate network packets, network messages, telephone calls, faxes, wireless signals and/or wired power signals as described herein. Connections to and from network 110 and server 120, host 140, and hosts 130-150 are shown. These may be typical network connections. In some cases, network 110 is not a LAN, but is connections through the Internet to at least one remotely located server 120 and at least one remotely located hosts 130-150, such as each remotely located at least 1 mile away.

The relay server 120 is a computing device (e.g., see FIG. 2) or a group of computing devices. The relay server 120 includes at least user input control information 136, state messages 148 (having some or all of state information 147, not shown, but part of messages 148), communication interface 122, unavailable detector 123, copy requestor 129, messages 125 and new host selector 121. The interface 122 is connected to communication interfaces 142 and 132-152 through network 110. The communications interfaces 122-152 operate to enable communications between the interacting computing devices of the system 100.

The relay server 120 may be for receiving control information 136 (the combination of information 136a-136n) through interface 122 from computing devices 130-150 engaged in co-activity within the interactive environment 144 at host 140, and for relaying through interface 122 that control information 136 to host 140. The relay server 120 may be for receiving through interface 122 state messages 148 having state information 147 from a simulating host 140, and for relaying through interface 122 those state messages to at least one or at least two of non-simulating hosts 130-150. State messages 148 may operate as subsets of or updates to all of the state information 147 that is shared among the simulating host 140 and the non-simulating hosts 130-150.

The relay server 120 may be self-hosted, meaning operated by a company or entity that enables the functions and systems described herein. Alternatively, the relay server 120 may be on a shared resource service such as Amazon AWS or Microsoft Azure.

In some cases, server 120 provides a single environment controlled focus point for managing all environment or game modes; provides an opportunity to avoid having to communicate through or deal with client network address translation (NAT) traversal and firewall issues; provides an opportunity to embed additional validation for client requests; provides an opportunity to manage host migration and resilience; provides an opportunity to efficiently implement multi-cast from a simulating host without an increase in upstream bandwidth.

In some cases, server 120, as the relay server acts as a go-between that introduces an additional network "hop" for data being transmitted from between host 140 or 180 and hosts 130-150. This can potentially increase latency although this latency may be mitigated based on geographic adjacency and improved network connectivity routing. In some cases, server 120, as the relay server is an additional server process that has to be maintained on top of the customary pair of client and server binaries. In other cases, the server 120 acts primarily as a relay of information and a central arbiter point for data, but otherwise allows the simulating host 140 and non-simulating hosts 130-150 to communicate most data directly with one another.

The simulating host 140 represents one or more simulating hosts such as one or more simulating servers and/or simulating clients. It can be just one simulating server or one simulating client. It can be one or more simulating servers and one or more simulating clients. It can be one or more simulating servers or one or more simulating clients. Each simulating host 140 is for simulating or processing a portion or all of the simulation processes or interactive environment 144. Each simulating host 140 is a computing device (e.g., see FIG. 2) or a group of computing devices. Each simulating host 140 includes at least host input control information 146, user input control information 136, state messages 148 having state information 147, communication interface 142, environment 144 and network controller 149. The interface 142 is connected to the communication interface 122 through network 110.

One or more of simulating host 140 may be for receiving control information 136 through interface 142 from server 120, and for creating (e.g., by receiving a user input at host 140 for or related to environment 144) host input control information 146. One or more of simulating host 140 may not receive information 136, such as when they are running non-player characters (NPCs), local competitive matches and/or another environment 144 that does not require information 136 from another host. For example, certain aspects of simulation or environment 144 such as NPCs and competitive matches may be reserved for certain ones of simulating host(s) 140 which do not receive information 136 from any other host (and optionally also not from server 120). The simulating host(s) 140 may be for simulating and updating the environment 144 based on the information 136 received and the information 146 created at host(s) 140. The simulating host(s) 140 may be for storing and updating state information 147 based on or for the simulated and updated interactive environment 144. Simulating and updating the environment 144 may be performed by processing environment software instructions hosted at host(s) 140 using information 136 and 146 as inputs.

The simulating host(s) 140 may be for communicating state messages 148 having the state information 147 through interface 142 to the relay server 120 which communicates them through interface 122 to the hosts 130-150, such as for the relay server 120 to update the non-simulating hosts 130-150 with changes of status 139 to the interactive environments 144 of hosts 130-150.

The network controller 149 may manage (e.g., be for managing) the communications between the relay server 120 and the non-simulating hosts 130-150 by sending messages (e.g., messages 148) to the hosts 130-150 from interface 142 and through server 120. The network controller 149 may operate as software to enable the functions described herein for a simulating host(s) 140. Non-simulating hosts 130-150 may initiate their own network controller 149 in the event of a transfer of control and state information 147 to one of the non-simulating hosts 130-150.

In some cases, controller 149 may be an implementation of an intelligent network controller responsible for a portion or all of the simulation (e.g., simulation of environment 144). In some cases, more than one of hosts(s) 140 may have a controller 149 that is an implementation of an intelligent network controller responsible for a specific portion or portion of the simulation and each network controller is responsible to distribute the simulation to the right set of host(s) 140 and/or hosts 130-150 (e.g., devices/clients). These network controllers may be responsible to facilitate communications between each other.

In some cases, multiple network controllers 149 (not shown) exist on simulating host(s), non-simulating host 130-150 and on relay server 120. These controllers form a system in which one or more of the controllers decide which controller owns the replication of certain aspects of the simulation or environment 144. A particular implementation of one or more network controllers decides which simulating host is simulating or owns what part/portion of the simulation (e.g., game's aspect), how the data is replicated by the controllers, and which simulating host owns the state information 147 and messages 148 related to each controller's simulation (e.g., aspect). For new aspects of the simulation, the network controllers decide which controller needs to be used for a specific simulation (e.g., game mode/game activity). Here, host migration is beneficial when a controller/simulation host disappears/is unavailable and the system wants to provide a smooth simulation/game experience for the users. The host migration may include migration of the network controller 149.

For example, it is possible to split up the simulation (e.g., environment 144) state between multiple simulating hosts or clients that are responsible for either all or a portion of the overall simulation. It's possible that a certain portion of the simulation are centralized and running on a company owned simulation host client or server while other aspects run on one or more other simulation host client devices. In this implementation the split of the simulation may be handled by the network controllers 149 of the multiple simulating hosts. Each network controller can handle the entire or a portion of the whole simulation and be responsible for the simulation work distribution, the state messages 148 and information 147 distribution across the hosts 140(*s*) and 130-150 machines. In some cases, a network controller exists on the relay server 120 (not shown) and on the relay server, this controller is managing the host migration and data distribution processes of messages 148.

For example, some portions of a game or experience may be sufficiently important or require sufficient security that those portions are always handled by a game server operated by the company or entity which operates the game or experience. Examples of such portions of a game or experience may include hit detection for a shooter-type experience, location processing for a race-type experience and for scoring the race (e.g. who wins and who does not win), shopping experiences where in-game merchandise is purchased, and general win condition processing for any competitive game or experience. In contrast, player chat functionality, the clothing being worn by a player character's avatar, video content being shown or emotes being executed, generalized movement and placement within the virtual world where there are no competitions based upon those positions or locations may be processed by a simulating host that is one of the computers of the players or other users because less security and consistency is necessary for a quality user experience. And, if one of those simulating hosts drops unexpectedly, the state data may be used to recover and no critical systems or situations result because the associated functions are less-important to overall game or experience stability or to any competition.

The simulating host(s) 140 may act much like a traditional "game server" to provide a computing device (such as simulating a server) into which one or more players may log in order to move about in a virtual world comprised of the associated art assets, models and textures. The simulating host(s) 140 may operate as an orchestrator of multiple players as they connect and interact with one another, and to ensure integrity of the process of login, and uniformity of the three-dimensional environment (which may actually be rendered locally on each user's machine from a set of game assets and files). In other cases, the login may be handled by the server 120.

Each of simulating host(s) 140 may be a computing device such as a personal computer, laptop computer, desktop computer or the like. The hosts 130-150 may be used by a user to connect through server 120 to simulating host(s) 140 to move an avatar about within a three-dimensional environment generated by the host(s) 140 (or, more accurately, on the hosts 130-150 as directed by the host(s) 140 through the environment server 120 using state messages 148).

The non-simulating hosts 130-150 are each a computing device (e.g., see FIG. 2) or a group of computing devices. The non-simulating hosts 130-150 each include at least one of user input control information 136*a*-136*n*, state messages 148 having state information 147, one of communication interfaces 132-152, environment 144 and changes of status 139. Each of the interfaces 132-152 is connected to the communication interface 122 through network 110.

The non-simulating hosts 130-150 each may be for creating (e.g., by receiving a user input at hosts 130-150 for or related to environment 144, as well as state messages 148 which may indicate changes of status 139 for the environment) and for sending one of information 136*a*-136*n* through interfaces 132-152 to server 120. The non-simulating hosts 130-150 each may be for receiving through interfaces 132-152 the state messages 148 having state information 147 from the relay server 120. The state information 147 may include changes of status 139 to environment 144 or has information from which changes of status 139 to environment 144 can be derived. The changes of status 139 are used, along with the user input control information 136*a*-136*n* to update the state information across the simulating host(s) 140 and the non-simulating hosts 130-150. The non-simulating hosts 130-150 each may be for updating the interactive environment 144, as shown on a display of the computing device (not shown) associated with the at least one or at least two non-simulating hosts to correspond to the changes of status 139. Updating the environment 144 may be performed by processing environment software instructions hosted at hosts 130-150 using information 147 as input.

The state messages 148 included information 147 and may include typical computer network package communication data such as source and destination computer IP addresses and the like. The state messages 148 are subsets or partial portions of state information 147, generated by the simulating host(s) 140 and the non-simulating hosts 130-150, and then passed to the relay server 120 and the other hosts 130, 140, and 150 to continuously update the environment with changes of status 139 which update the state information 147. State messages 148 may be used to send some hosts only a portion of the state information 147, which may be voluminous in some cases, so that one of the non-simulating hosts may become a simulating host should a simulating host 140 suddenly disconnect or become unavailable.

The state information 147 may include at least two of character data (such as including avatar health, shooting, and/or other actions), weapons data (such as including avatar weapon type, weapon ability, shooting, and/or other actions), and location data (such as including avatar movement, shooting, and/or other actions). It may include game related timing information and results to the character data based on actions of other users or hosts. It may include IP addresses of the other hosts. It may include data for displaying a menu, creating multiple screens in the game, re-starting a level, pausing the game, defeating enemies or other players, making is so this player's avatar/character flashes, runs, walks, emotes, sleeps, etc., changes clothing, or otherwise alters the player avatar's appearance. State information may also simply include a location of and game or experience type where and in which each connected host's player or avatar is involved or presently located. The state information 147 is sufficient information to recreate the present state of the experience for all connected hosts at a given time or at a time in the near past to which the system could fall back to in case of a sudden loss of a simulating host.

The computing devices of non-simulating hosts 130-150 may each be effectively identical to (or at least not significantly different from) that of the simulating host 140. Non-simulating hosts 130-150 are not hosting environment 144, do not have network controller 149, and do not generate but receive from server 120 the state information 147 in messages 148.

Non-simulating hosts 130-150 may be n non-simulating hosts 130-150 controlled by and connected to host(s) 140 through server 120. The number n may be between 1 or 2, and thousands. The number n may be between 2 and 1000. It may be between 2 and 200. It may be between 2 and 20. It may be between 2 or 3 and any of the second numbers noted.

Relay server 120 may be hosted by a game or experience provider, such as Microsoft® Azure hosting services or Amazon Web Services®. One or more of the simulating host(s) 140 may be a player-operated client computer serving as a simulating game server the provides a game or other experience in or as environment 144. The non-simulating hosts 130-150 may be client computers participating in the game or experience or environment 144; and connected, via the relay server 120, to the simulating host(s) 140. The non-simulating hosts 130-150 may be engaged in co-activity within the interactive environment having the game or experience. The simulating host(s) 140 may handle all game logic, including simulating the in-game avatar movement, health, shooting, actions, etc. By default (e.g., automatically without any user input or receiving any control information), if one, more than one or all of the simulating host(s) 140 become unavailable to (e.g., disconnects from) server 120, the game or environment 144 may end for all connected non-simulating clients 130-150 as well because the state information 147 is not shared by the server 120 to the non-simulating clients 130-150.

By transitioning the typical game simulation server responsibilities in the server-client infrastructure to merely a relay server 120, most of the load of enabling these services is offloaded to one of the clients (e.g., as simulating host 140). As a result, the relay server 120 may serve many more clients than a typical server-client model server. In cases where a traditional server system is needed for speed, security or other reasons; the relay server 120 may be used to transition the simulating host 140 functions to a more-traditional server architecture, which may be hosted at a high availability server infrastructure such as Microsoft® Azure or Amazon Web Services® much as the relay server 120 is hosted.

However, the system that offloads the traditional server functions to the simulating host(s) 140 and that simultaneously enables connection by many players or users must be prepared for that simulating host(s) 140 to disconnect or otherwise become unavailable. Otherwise, the system will perform poorly and provide a poor overall experience for connected players and users.

There may also be configurable distribution of game server responsibility. Server responsibility can be offloaded to a single simulating host 140 such as a client computer or may be spread among multiple hosts or clients, such as multiple ones of host(s) 140. For example, a given "area" within a game or environment (e.g. a portion of a game world or a portion of an interactive experience such as a game lobby or one group of virtual buildings, or one level within a game world, or one user-generated content area within a game world, or one experience (e.g. a dance party experience)) may be instanced or sharded and hosted by one of the simulating hosts 140. Other portions of the same overall game world may be hosted by another simulating host 140. As player avatars for a given simulating host 140 may move within that game world, the overall system must be prepared to transition control and hosting to another simulating host as-needed.

Alternatively, a simulating host 140 may host a portion of a game world or other experience for users (e.g., simulate a portion of environment 144) within a nearby geographic space (e.g. all users who are in a given Zip Code, a given IP address range, in Los Angeles, California or all users in California). So, clients in that physical area may have responsibility handled by and be connected to a nearby host 140 acting as the simulating host while others in a different geographic area may be connected to another simulating host 140, while still in the same in-game or in-environment location. Each simulating host 140 may be connected to non-simulating hosts through a relay server 120.

Processing for hosts and in-game components may be split between different connected user simulated hosts (e.g., clients) simultaneously. So, portions of the game or environment or aspects of a game or environment may be managed by one connected client, while other portions may be handled by another. So, for example, all moving characters may be handled by one simulating host while the non-player characters in a given environment may be handled by another. In this way, the load of an overall game experience or interactive environment may be split across multiple simulating hosts.

In addition, the relay server 120 may act as a data broker to maintain an active state (such as state information 147 transferred and updated using state messages 148) and to arbitrate issues in the case of a disagreement between hosts or disconnection of a simulating or non-simulating host.

Instancing and spatial partitioning (e.g., co-existence in the same virtual space, but not on the same server or simulating host) can also be addressed by the same infrastructure systems that perform load balancing and ensure consistency across multiple sets of relay servers, simulating host(s) and non-simulating hosts. So, for example, a group of player avatars may be present in a virtual location within a game world. A given simulating host may host only the player avatars in that virtual location, but not the entire game world. Or, a given simulating host may only host a subset of the player avatars in that virtual location, while another simulating host hosts other players. Many simulating hosts may "overlap" hosting subsets of player groups within a given virtual location, or across an entire game or experience or zone that is merely a part (e.g., portion of the simulation processing or simulating of environment 144) of the entire game or experience.

In addition, the game or experience components may be distributed as well. So, certain groups of the simulating hosts may be responsible for certain portions of the in-game components, while other hosts may be responsible for others. Smoothly transitioning in the case of an unexpected drop of a host 140 may require continuous updating of at least portions of the experience state (such as state information 147 in state messages 148) across hosts 140.

In some cases, each of the non-simulating hosts 130-150 receives and stores a sub-portion (e.g., some) of the state information 147 for the interactive environment 144 on a periodic basis obtained through the relay server from the simulating host. The period may be between 0.2 and 5 seconds. It may be between 0.5 and 2 seconds. It may be between 1 and 2 seconds. It may be 1 or 2 seconds. Each sub-portion of the state information stored by each of the hosts 130-150 hosts 130-150 may be combined to recreate the state information 147 for the interactive environment 144 in the event that the simulating host 140 becomes unavailable.

Figure 1B:
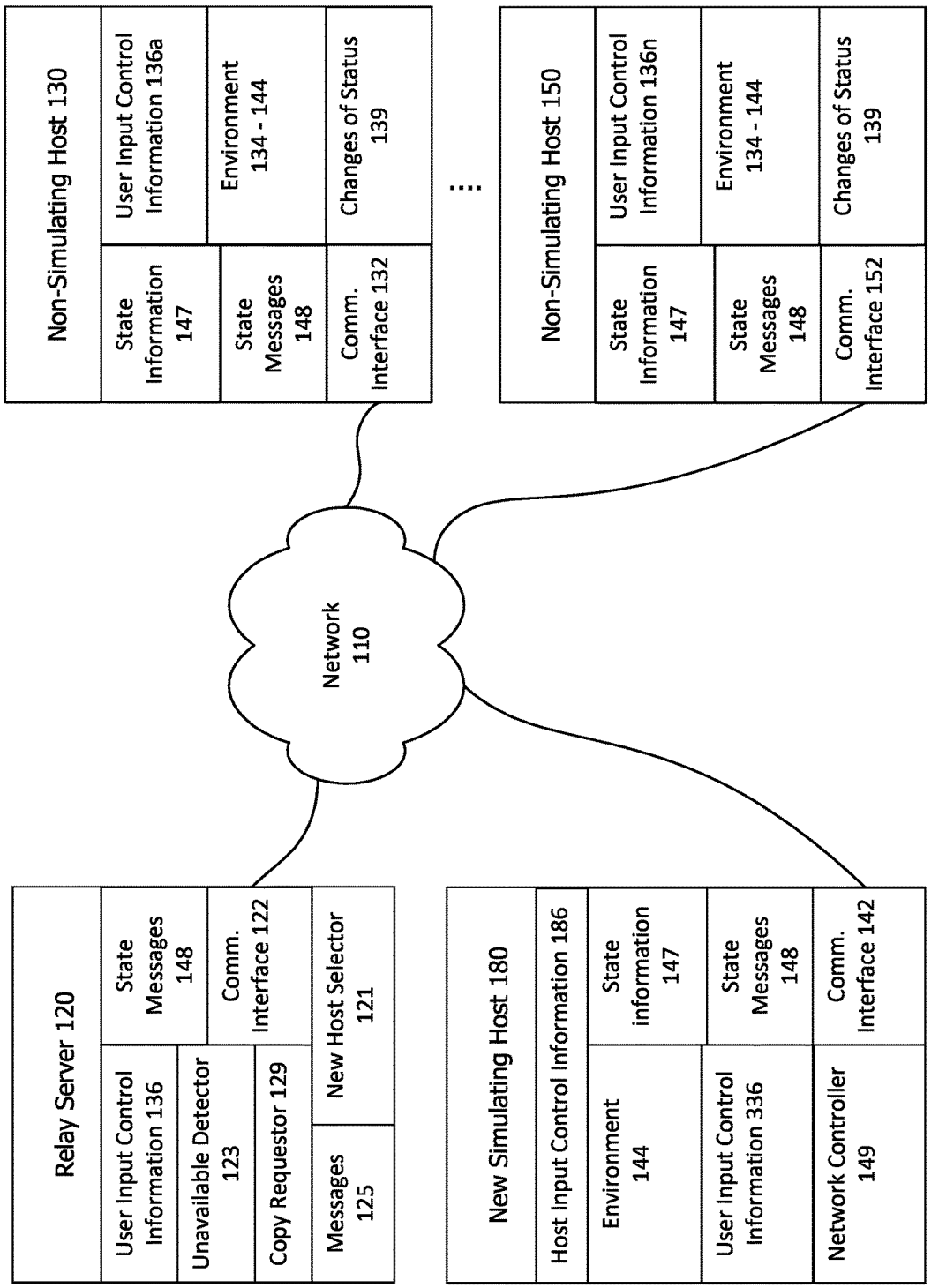
FIG. 1B is a block diagram of a system for dynamic transitioning of a simulating host of a portion or all of network interactive environments, showing a new simulating host.

Referring now to FIG. 1B, an overview of a system 102 for dynamic transitioning of a simulating host of a portion or all of network interactive environments is shown. The system 102 includes a relay server 120, a new simulating host 180 and non-simulating hosts 130-150; all interconnected by a network 110. System 102 and simulating host 180 being "for" doing an action may mean that they are configured to and/or adapted to perform that action such as for dynamic transitioning of a simulating host of a portion or all of network interactive environments. System 102 may be a network architecture for an interactive environment 144.

System 102 may be similar to system 100 but use new simulating host 180 in place of an unavailable original simulating host 140. In some cases, system 102 may transition to and/or use new simulating host 180 in place of more than one unavailable original simulating hosts 140. Thus, hosts 130-150 in FIG. 1B are one less host (e.g., are n−1) than the number n in FIG. 1A as one of them has become the new simulating host 180. Also, host 140 is now unavailable (or unsuitable) and thus not participating in environment 144.

One of host(s) 140 (e.g., an original simulating host) of FIG. 1A may become unavailable to server 120 (e.g., become an unavailable host 140) by disconnecting from server 120 for a threshold period of time Th or by server 120 not receiving one or more of state messages 148 for a threshold period of time Th. The threshold period Th may be between 0.001 and 5 seconds. It may be between 0.01 and 2 seconds. It may be between 1 and 2 seconds. It may be 1 or 2 seconds.

The system 100 and/or server 120 can dynamically migrate from the original simulating host 140 to the new simulating host 180 the network controller 149 functionality as well as the overall game state (e.g., environment 144 and/or state messages 148) to ensure a smooth transition as the replicating or original simulating host 140 becomes unavailable such as by leaving or disconnecting unexpectedly. The migration is preferably invisible to the non-simulating hosts 130-150 and in that sense is "dynamic" as it happens in real time, with the new simulating host 180 picking up using the state information 147 to recreate and continue hosting the environment 144 as seamlessly as possible as directed by the relay server 120.

The relay server 120 may be used for dynamically transitioning of an original simulating host 140 of FIG. 1A to a new simulating host 180 of FIG. 1B for network interactive environment 144. The functions and actions of relay server 120 have been partly discussed in FIG. 1A.

The relay server 120 may also use unavailability detector 123 to detect an unavailability of the original simulating host 140; use new host selector 121 to select one of the non-simulating hosts 130-150 to become a new simulating host 180; use messages 125 to send messages to the non-simulating hosts 130-150 of the unavailability of the original simulating host 140 and send messages to the selected new simulating host 180.

The unavailability detector 123 may be for detecting the unavailability by determining that no state message has been received from original simulating host 140 through interface 122 for a threshold period of time Th. The threshold period Th may be a period that it will take the relay server 120, say, 1 or 2 seconds to determine that original simulating host 140 is truly dead or non-responsive to messages from server 120, such as having information 136. Unavailability may be detected using another process.

New host selector 121 may be for selecting one of the non-simulating hosts 130-150 to become a new simulating host 180. Selector 121 may select the new simulating host 180 (such as to not pick a "bad" simulating host) based on one or more of the following metrics (e.g., logic): high CPU performance, high memory performance, high internet connection speed and/or bandwidth. Being "high" may be at a threshold that does not detrimentally affect the environment or game experience for all hosts 130-150. The metrics may include capability metrics that can advertise the new hosts suitability for the task of hosting or simulating. For example, as part of a startup sequence of connections 410, hosts 130-150 may assess the CPU performance along with memory performance or anything else and devise a series of ratings for the hosts 130-150 and/or selection by selector 121. Also, during or after connections 410, the selector 121 and/or hosts 130-150 can perform some internet connection tests allowing it to measure ping times and upload/download bandwidth of hosts 130-150 that can also provide those metrics. These metrics and/or ratings can be transmitted by hosts 130-150 as part of connection sequence 410 to the relay server 120 to allow selector 121 to determine which of hosts 130-150 nts may be the most suitable for hosting, such as based on one or more of the metrics.

Selecting original simulating host 140 or new simulating host 180 may occur when a remote client (e.g., one of hosts 140 or 130-150) establishes a connection with server 120 (e.g., selector 121) which decides pretty early (e.g., within 1 to 2 seconds) on whether the remote client is going to be the simulating client (e.g., a simulating host 140 or 180) or a replicated client (e.g., a non-simulating host). As a consequence, server 120 takes different actions and perform different setups for the remote client accordingly. For example, a number of classes will act upon the host status (simulating or non-simulating) from within their Begin-Play( ) method. This can be pretty much anything but most likely includes:

Binding functions/methods
    Instantiating different classes, objects or components for whether the remote client is Simulating or Replicated.
    Loading different data
    Setting up different global data, lookup maps, etc.

In order to achieve a host migration, a remote client needs to be able to transition from a replicated client to a simulating client. Server 120 is able to provide support to help with identifying when it can do this and what it needs to do.

Selector 121 may select the new simulating host 180 based on one or more of the following metrics: the next one of hosts 130-150 that relay 120 receives a message 148 from and/or receives one of information 136*a-n* from; the next host relay 120 has bi-directional communication with, is the host with the most advanced system for simulating environment 144 (e.g., fastest processor speed and/or most RAM memory) or is the host with the fastest communication link (e.g., fastest Ethernet cable, Internet, WIFI, etc. communication speed) to server 120. Selecting may be selecting based on one, two, three or more of the above metrics. In some cases, the host with the lowest latency communication with server 120 is selected as the new simulating host.

In some cases, host(s) 140 and/or host 180 are server computer simulating hosts or server simulating hosts instead of client computer simulating hosts or client simulating hosts. In this case, they do not have information 136 and all of the user information is in information 146. This may be when selector 121 selects a server to be the simulating host based on the need for metrics requiring a certain or threshold high processor speed, high memory amount, high network communication speed, low latency, and/or high security. For example, for competitive games modes or game environments such as FPS there may be different modes or metrics for selecting the simulating host to be based on than for chat room type environments. Selector 121 may select a server or client to be the simulating host based on the need for metrics requiring a more complex or a less complex, or a more secure or less secure, or a more peer to peer or less peer to peer environment. It can be based on a combination of any two or more of these metrics.

Selector 121 may select a server or client to be the simulating host based on the need for metrics requiring more game world security so that less people are cheating or using particular abilities to alter the game world. On a client simulating host, there can be some cheat protection, some basic protection that is not as strong as it can be on a server simulating host. Free to play games may perform integrity checks by sending a sub-set of events (e.g. buying things in a pay game) to a specific server host to double-check the status of these events.

Selector 121 may use other selection criteria for selecting new simulating host 180 such as CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

Selector 121 may select a server or client to be the simulating host based on the need for metrics requiring more trust (select server) or less trust (select client or server). A client computer may be selected as a simulating host 140 or 180 based on it being in a geographical zone where it is "trusted" so the server 120 selects this client host to simulate or be transitioned to because there's no security risk. In that case the client simulating host may be in a "trusted client" mode.

A server computer may be selected as a simulating host 140 or 180 based on the game or environment being in a "game" mode with achievements, or one that requires very secure connections, low latency, or otherwise requires more control over the overall simulation of the environment. In such a case, the server 120 selects this server host to simulate or be transitioned when server 120 does more rigorous checks and client hosts may be in a less-trusted environment. Examples of such cases may be competitive games such as first person shooters, massively online battle arenas, or other competitive experiences or games where using a host computer to act as the new simulating host 180 may advantage or disadvantage certain participants or make cheating or winning easier for some participants (e.g. the host themselves).

Messages 125 may be for transmitting copies of the state messages 148 having state information 147 to the new simulating host 180; and instructing the new simulating host to begin operating as the new simulating host 180 based on the transmitted state messages 147. Messages 125 may include any number of messages, such as messages of FIGS. 4 and 6.

The relay server 120 may be for receiving and storing periodic updates of some or all of the state information 147 (such as in messages 148) from the original simulating host(s) 140; and buffering and sending to the new simulating host 180, message in flight between the relay server 120 and the unavailable simulating host(s) 140.

The relay server 120 may be connected through a computer network 110 between the original simulating host(s) 140 and non-simulating hosts 130-150 before detecting an unavailability of the unavailable simulating host 140. Server 120 may be connected through the computer network 110 between the new simulating host 180 and the at least one or at least two non-simulating hosts 130-150 after instructing host 180 to be the new simulating host.

Server 120 instructing the new simulating host 180 to begin operating as the new simulating host 180 may include instructing the new simulating host to simulate the interactive environment 144 based on the control information 147 received from server 120; store and update the state information 147 based on the interactive environment 144; and communicate state messages 148 having the state information 147 to the relay server 120 for the relay server to update the non-simulating hosts 130-150 with the changes of status 139 to the interactive environment 144.

The simulating host 180 is a computing device (e.g., see FIG. 2) or a group of computing devices similar to host 140 or hosts 130. The simulating host 180 includes at least host input control information 186, user input control information 136, state messages 148 having state information 147, communication interface 142, environment 144 and network controller 149. The interface 142 is connected to the communication interface 122 through network 110.

The communications interfaces 142 and 132-152 may operate to enable communications between the interacting elements 120, 140, 180 and 130-150 of the systems 100 and 102. These communications interfaces may include the various hardware network components discussed as a part of the computing devices. However, they also may include application programming interfaces (APIs), unique network connectivity systems and data protocols used by these computing devices to communicate between each other securely and efficiently under the unique circumstances of the systems 100 and 102.

The new simulating host 180 may be for creating (e.g., by receiving a user input at host 180 for or related to environment 144) host input control information 186. Otherwise, host 180 may function the same as a host 140. For example, the new simulated host 180 may be a client computer or a server computer, and may be for storing and updating the state information 147 for the interactive environment 144; and for communicating state messages 148 having the state information 147 to the relay server for the relay server 120 to update the non-simulating hosts 130-150 with the changes of status 139 to the interactive environment 144. Host 180 may have a network controller 149 for acting as a network controller managing communication between the relay server 120 and the non-simulating hosts 130-150.

Thus, the system 100 and/or server 120 may operate to effectively pause a game or experience or environment 144 to enable host migration from unavailable host 140 to new host 180. Relevant state data (e.g., some or all of state information 147 and state messages 148) may be handed to the new simulating host 180, as instructed by the relay server 120, reliant upon the state information 147 present in one or more (and in whole or in part) non-simulating host 130-150. Once the process is complete, the game or experience may be resumed by the new simulating host 180. The pause may appear to be seamless to a user or may be between 0.2 and 5 seconds. It may be between 0.5 and 2 seconds. It may be between 1 and 2 seconds. It may be 1 or 2 seconds. During the pause, the game does not function correctly. The game or experience may be paused or may continue, while the data "catches up" with each player and any actions taking place.

As an alternative strategy, the system 100 (e.g., including server 120 and hosts having parts of information 147) and/or server 120 may perform seamless host migration by having overlapping state data or information 147 spread across multiple machines 120 and/or 130-150, with a single simulating host being responsible for operating the game. In the event of an unexpected simulating host transition, the state data missing from a new simulating server 120 may be requested and obtained from the other non-simulating hosts 130-150, then transmitted to the new simulating host 180. A pause may be required or, depending on the game or experience type, this may be handled relatively seamlessly or entirely seamlessly from the perspective of a given player on hosts 130-150.

One way to handle this issue is to distribute the state data or information 147 across multiple hosts 130-150. A single host or multiple hosts 140 can be responsible for being the simulating host 140, and the way to transition seamlessly from the one of the replicating (e.g., simulating) host(s) 140 to another non-replicating hosts 130-150 to act as the replicating host 180 may be called host migration. It may be preferrable to distribute the state data 147 or merely to have a ready periodic back up of the state information 147 for all accounts on at least one additional client 130 or server 120. This ensures cohesive determinism of the state information 147 in the event one replicating client or host 140 drops unexpectedly.

In some cases, there may be more than one of simulating hosts 140 and/or more than one of server 120 and/or hosts 130-150 having parts of state information 437. The hosts 140 may be transitioned to one or more of host 180. This may be considered a "more than one case."

In the more than one case, the relay server 120 may use unavailability detector 123 to detect an unavailability of the one or more simulating hosts; use new host selector 121 to select one or more of the non-simulating hosts 130-150 to become one or more new simulating host; use copy requestor 129 to request a copy of parts or all of the state information 147 of messages 148; use messages 125 to send messages of the unavailability of the simulating host and send messages to the selected new simulating host(s).

In this more than one case, the unavailability detector 123 may be for detecting the unavailability by determining that no state message has been received through interface 122 for a threshold period of time Th from the host(s). In this more than one case, new host selector 121 may be for selecting one or more of the non-simulating hosts 130-150 to become new simulating host(s) based on one or more of the factors noted above. In this more than one case, messages 125 may be for transmitting copies of the state messages 148 having state information 147 to the new simulating host(s); and instructing them to begin operating as the new simulating host(s) based on the transmitted state messages 147. In this more than one case, the relay server 120 may be for buffering and sending to the new simulating host(s), messages in flight between the relay server 120 and the unavailable simulating host(s); and for instructing the new simulating host(s) to begin operating as the new simulating host(s) and instructing them to simulate the interactive environment 144 based on information 147 at the server 120 or requested and received from one or more hosts 130-150.

In the more than one case, the relay server 120 may use copy requestor 129 to request copies of each sub-portion of the state information of messages 148 stored by each of the non-simulating hosts 130-150; use interface 122 to transmits the copies of each sub-portion of the state information of messages 148 to the new simulating host; and use interface 122 to instruct the new simulating host to recreate the state information from the sub-portions and to begin operating as the new simulating host based on the recreated state messages 148 transmitted by server 120 (e.g., see FIG. 1B).

In other cases, server 120 may not need or use copy requestor 129 to request copies of each sub-portion of or all of the state information 147, but will use copy requestor 129 to request all of the state information of messages 148 stored by one of hosts 130-150; use interface 122 to transmits the copy of the state information of messages 148 received by server 120 to the new simulating host; and use interface 122 to instruct the new simulating host to begin operating as the new simulating host based on the state information of the state messages 148 that was received by server 120 (e.g., see FIG. 1B).

In another case, server 120 may not need or use copy requestor 129 to request copies of each sub-portion of or all of the state information of messages 148, but will use interface 122 to transmits a copy of the state information of messages 148 at server 120 to the new simulating host; and use interface 122 to instruct the new simulating host to begin operating as the new simulating host based on the state messages 148 that was at the server 120 (e.g., see FIG. 1B).

System 100 and 102 may be considered peer to peer (P2P) or mesh networks due to the hosts 120, 180 and 130-150 communicating with each other as equal partners.

Figure 2:
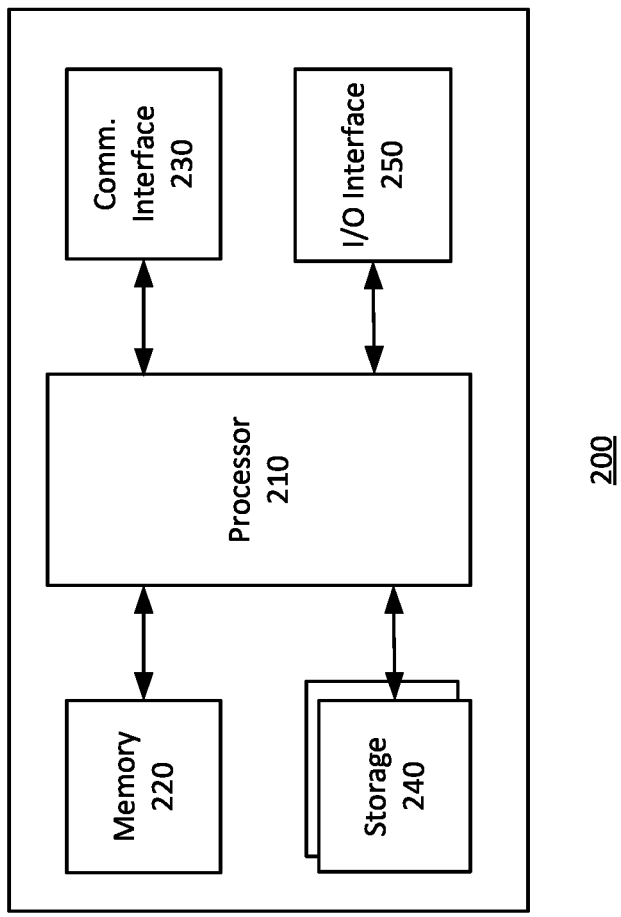
FIG. 2 is a block diagram of an exemplary computing device.

FIG. 2 is a block diagram of an exemplary computing device 200, which may be or be a part of the relay server 120, a simulating host 140, a simulating host 180 and/or a non-simulating hosts 130-150 of FIGS. 1A-1B. As shown in FIG. 2, the computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor, such as for dynamically transitioning of a simulating host of a portion or all of network interactive environments. These stored software programs may include an operating system software. The operating system may include functions to support the input/output interface 250, such as protocol stacks, coding/decoding, compression/decompression, and encryption/decryption. The stored software programs may include an application or "app" to cause the computing device to perform portions of the processes and functions described herein, such as the process of dynamically transitioning of a simulating host of a portion or all of network interactive environments. The word "memory", as used herein, explicitly excludes propagating waveforms and transitory signals. The application can perform the functions described herein.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these functions in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage (e.g., non-transitory) media in a storage device included with or otherwise coupled or attached to a computing device 200, such as, when executed, for performing dynamically transitioning of a simulating host of a portion or all of network interactive environments. That is, the software may be stored in electronic, machine readable media. These storage media include, for example, magnetic media such as hard disks, optical media such as compact disks (CD-ROM and CD-RW) and digital versatile disks (DVD and DVD±RW), flash memory cards, and other storage media. As used herein, a storage device is a device that allows for reading and/or writing to a storage medium. Storage devices include hard disk drives, DVD drives, flash memory devices, and others.

The server 120, and hosts 140, 180 and 130-150 may each be or include an apparatus having a non-transitory machine readable medium storing a program having instructions which when executed by a processor will cause the processor to dynamically transition a simulating host of a portion or all of network interactive environments.

Description of Processes

Figure 3:
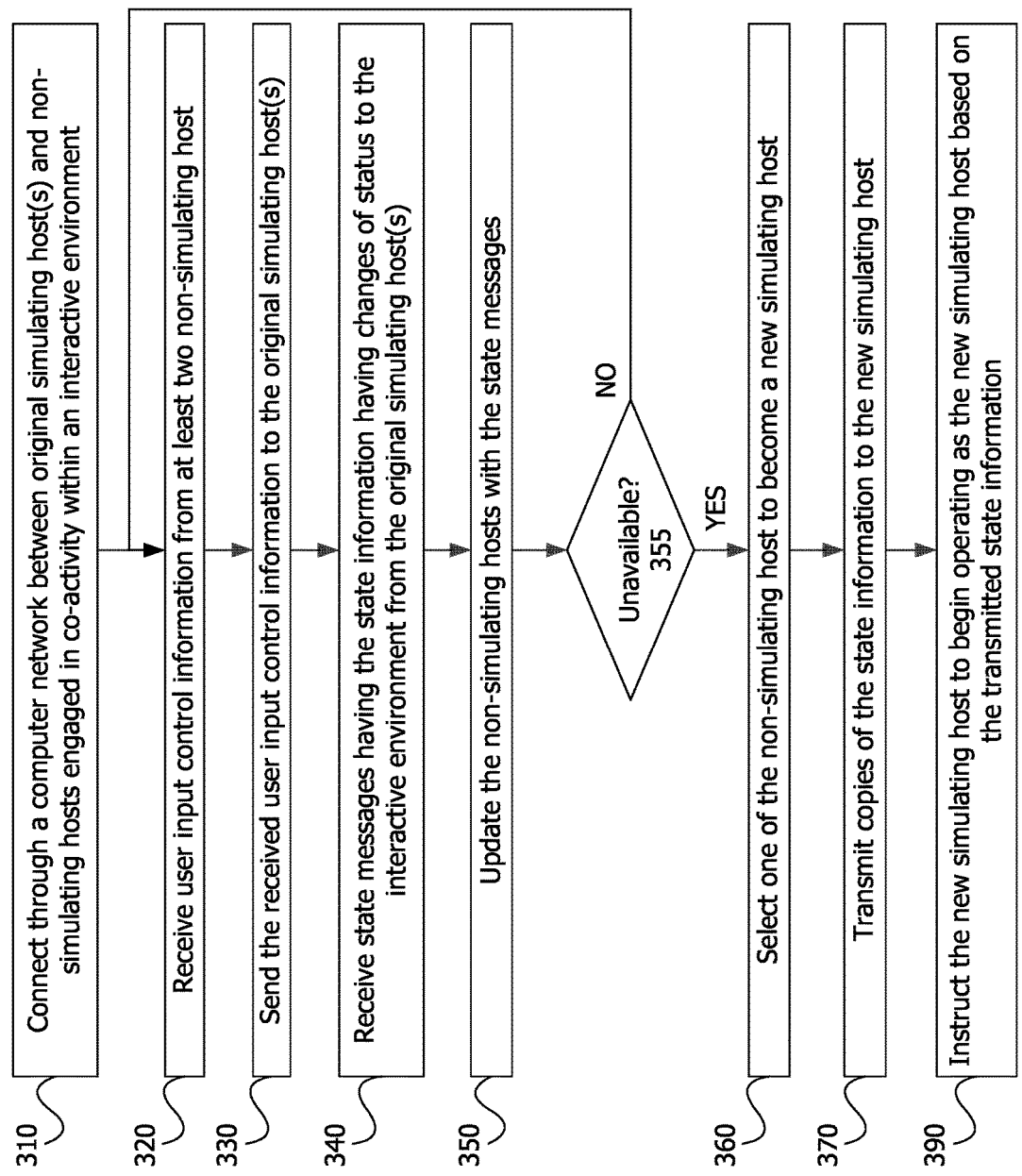
FIG. 3 is a flowchart of a process flow for dynamic transitioning of a simulating host of a portion or all of network interactive environments.
Figure 4:
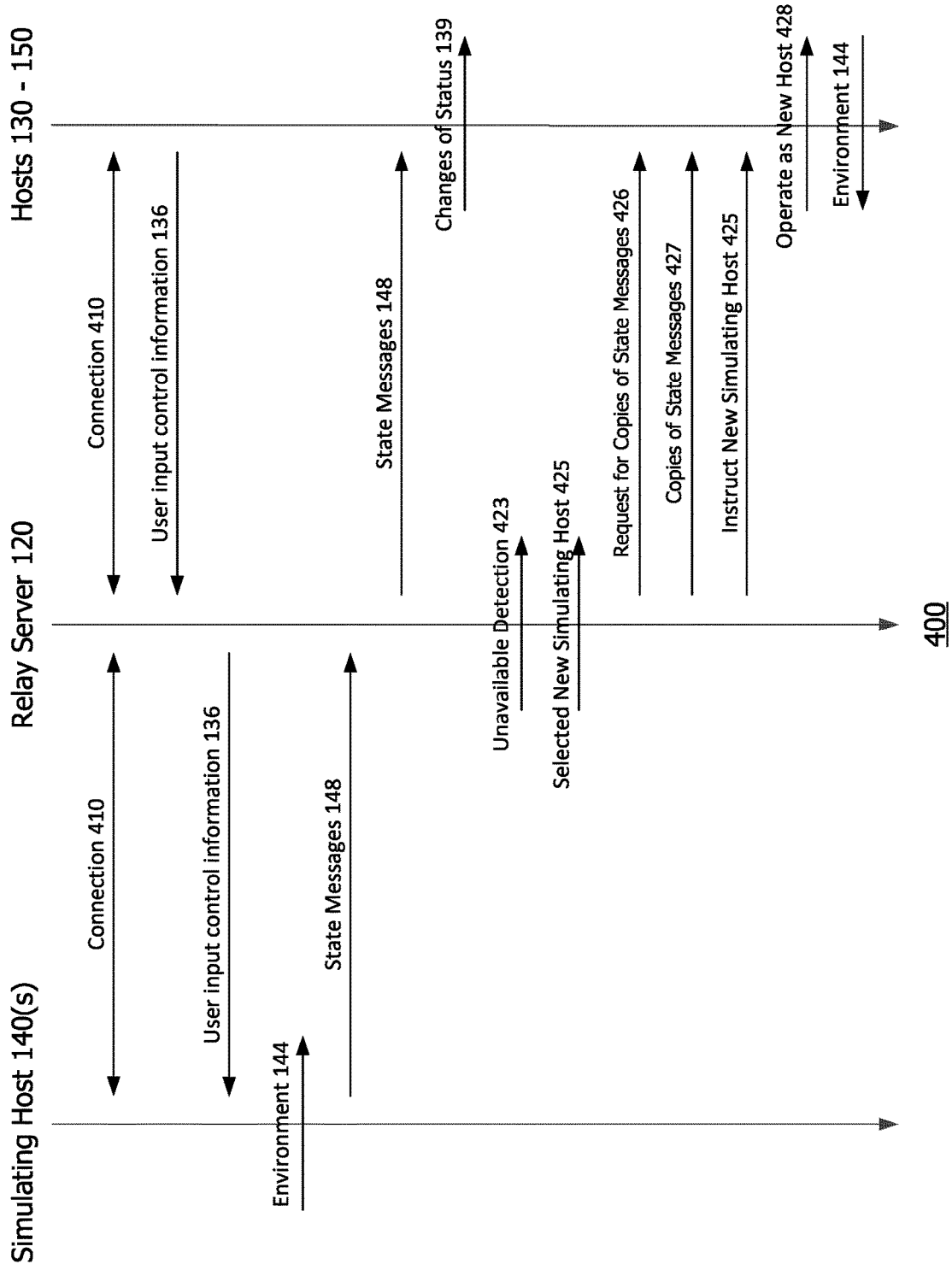
FIG. 4 is a signal flow diagram for dynamic transitioning of a simulating host of a portion or all of network interactive environments.

FIG. 3 is a flow chart of a process flow 300 for dynamic transitioning of a simulating host of a portion or all of network interactive environments. FIG. 4 is diagram of a signal flow 400 for dynamic transitioning of a simulating host of a portion or all of network interactive environments.

The flow 300 and/or flow 400 may be performed by a relay server 120 for dynamic transitioning from an original 140 to a new simulating host 180 of an interactive environment 100 or 102. The flow 300 and/or flow 400 may be performed by server 120, system 100 and/or system 102. The process flow 300 has both a start step 310 and an end step 390, but the process may be cyclical in nature, such as by returning to step 310 after step 355 or step 390, such as to dynamically transition from new host 180 to a different or an additional new simulating host. The process flow 400 has both a start connection 410 and an end environment 144, but the process may be cyclical in nature, such as by returning to connection 410 or information 136 after status 139 or final environment 144. Certain steps may not be shown in the flow 300 and/or 400. The actions, connections, messages, information, etc. described and sent and received in flow 300 may be shown in flow 400.

At the start, the process begins with step 310 at which the original simulating one of host(s) 140 and (e.g., one, two or more of) non-simulating hosts 130-150 engaged in co-activity within the interactive environment 144 are connected through a computer network 110. Step 310 may include server 120, host(s) 140 and hosts 130-150 being connected by connections 410 through network 110, such as using interfaces 122, 142 and 132-152. Step 310 may include host(s) 140 connecting to hosts 130-150 through server 120 through network 110.

After step 310, at step 320 server 120 receives user input control information 136 from non-simulating hosts 130-150. Step 320 may include server 120 and host(s) 140 receiving user input control information 136 from 130-150 through network 110.

After step 320, at step 330 server 120 sends the received user input control information 136 to the original simulating host(s) 140. Step 330 may include server 120 sending the received user input control information 136 from hosts 130-150 through network 110 to the original simulating host(s) 140. Step 330 may include server 120 sending the received user input control information 136 to the original simulating host(s) 140, such as for the host(s) 140 to simulate and update the environment 144 based on the information 136 and the information 146.

After step 330, at step 340 server 120 receives state messages 148 having the state information 147 having changes of status 339 to the interactive environment 144 from or communicated by the original simulating host(s) 140 based on the user input control information 136 from non-simulating hosts 130-150 and user input control information at or of the original simulating host(s) 140. Step 340 may include server 120 receiving state messages 148 having the state information 147 having changes of status 339 through network 110 from the original simulating host(s) 140.

After step 340, at step 350 server 120 updates the non-simulating hosts 130-150 with the state messages 148 having information 147. Step 350 may include server 120 updating the non-simulating hosts 130-150 through network 110 with state messages 148 having the state information 147 from the original simulating host(s) 140. Step 350 may include server 120 updating the non-simulating hosts 130-150 through network 110 with the state messages 148 from host(s) 140, such as for the relay server 120 to update the non-simulating hosts 130-150 with changes of status 139 to the interactive environments 144 of hosts 130-150.

At step 355, server 120 detects whether a host 140 is unavailable. Step 355 may include server 120 detecting the unavailability of the host 140 through network 110 as noted herein. If the host 120 is available, process 300 returns to step 320, or optionally any of the other of steps 310-355. If the host 120 is unavailable, process 300 continues to step 360.

At step 360 server 120 selects one of the non-simulating hosts 130-150 to become a new simulating host 180, such as based on or using a selection criteria. In some cases, selecting at step 360 is based on at least two of the selection criteria. Step 360 may include server 120 selecting one of the non-simulating hosts 130-150 to dynamically transition to from original unavailable simulating host 140 as noted herein. Step 360 may include server 120 sending messages 423 through network 110 to the at least one or at least two non-simulating hosts of the unavailability detection at step 355 of the simulating host 140 and sending selected new simulating host message 425 to the non-simulating hosts 130-150 (and optionally to host 180) of the selected new simulating host 180.

Next, at step 370 server 120 transmits copies 427 of the state messages 148 and/or some or all of state information 147 to the new simulating host 180. Step 370 may include server 120 transmitting copies 427 of the state messages 148 received from host(s) 140 or host(s) 130-150 or stored at server 120 having information 147 through network 110 to the new simulating host 180. Step 370 may include server 120 requesting copies of state messages 426 or copies of all or sub-portion of the state information 147 stored by each of the at least one or at least two non-simulating hosts 130-150, and transmitting the copies of all or each sub-portion of the state information 147 to the new simulating host 180. Step 370 may include server 120 receiving and storing periodic updates of all or sub-portions of the state information 147 from the original simulating host(s) 140 through network 110; and buffering and sending to the new simulating host 180, message in flight between the relay server 120 and the unavailable simulating host(s) 140 through network 110.

After step 370, at step 390 server 120 instructs the new simulating host 180 to begin operating as the new simulating host based on the transmitted state messages 148 or information 147 from server 120 at 370. Step 390 may include server 120 sending instructions 428 to the new simulating host 180 to begin operating as the new simulating host through network 110. Step 390 may include server 120 instructing the new simulating host 180 to simulate the interactive environment 144 based on the user input control information 136 from the non-simulating hosts and user input control information 186 at or of the new simulating host 180; store and update the state information 147 based on the interactive environment 144; and communicate state messages 148 having all or sub-portions of the state information 147 to the relay server 120 for the relay server to update the at least two non-simulating hosts 130-150 with the changes of status 139 to the interactive environment 144.

Step 390 may include server 120 sending the received user input control information 136 to the new simulating host 180 (not shown), such as for the host 180 to simulate and update the environment 144 based on the information 136 and the information 186. Step 390 may include new simulating host 180 operating as new simulating host 430 by simulating and updating the environment 144 based on the information 136 and the information 186.

Step 390 may include server 120 updating the non-simulating hosts 130-150 through network 110 with the state messages 148 with all or sub-portions of the state information 147 from host 180, such as for the relay server 120 to update the non-simulating hosts 130-150 with changes of status 139 to the interactive environments 144 of hosts 130-150.

In some cases, flows 300 and 400 include or are a synchronous simulating host migration where the relay server 120 decides that a simulating host migration is to occur at step 335 and/or 423. Then, to initiate the host migration, at step 423 the relay server 120 sends all connected hosts 130-150 a new message 125 to say that host migration has begun.

When the hosts 130-150 receive the message that host migration has started, hosts 130-150 pause their processing and display a screen overlay indicating that host migration is in progress. At 425 relay server 120 (e.g., selector 121) chooses the new simulating host 180 and sends a message 125 or 425 to inform the host 180 that it needs to now take control of simulating and act as unavailable host 140 was acting prior to becoming unavailable.

Then at step 428 new simulating host 180 makes the change to assume control of the simulation as unavailable host 140 was acting prior to becoming unavailable. This may require a successive series of changes at host 180, such as based on messages from server 120, such as messages 148.

Then, when the new simulating host 180 has made the change, it informs the relay server 120 that it is ready to operate as new host 180, such as at step 428. At this time, the environment or game may still be nationally paused for hosts 130-150.

Once the relay server 120 has been informed by message 428 that the new simulating host 180 is ready to go and take over acting as unavailable host 140, it informs or send a message 125 from host 180 through server 120 that all the other hosts 130-150 can resume the environment or game. Informing may include server 120 or host 180 sending state messages 148 to all the other hosts 130-150.

Once each of all the other hosts 130-150 has received the notification 125 that they can resume, they may remove the screen overlay and carry on with the environment 144 and proving information 136.

In this case, during steps 355-390 and/or messages 423-430, messages such as having information 136, messages 148, and/or RPCs destined to the original unavailable simulating host 140 may be lost, not processed by a simulating host and/or not received by the host 180. The relay server 120 may buffer any of these messages that are not acknowledged so that server 120 can reissue them to the newly promoted simulating host 180. This may also cover any of these messages received during the selection of new simulating host 180, such as during steps 355-390 and/or messages 423-430.

In these some cases, selection of a new simulating host fails at step 360 and/or 425 (e.g., server 120 chooses to ignore or select certain hosts as potential simulating host candidates because their metrics of PC specifications are too low and/or their internet/network connection speed is poor); or host 180 fails to operate as a simulating host (e.g., fails to operate as unavailable host 140). In these cases, the process of steps 360-390 and/or messages 425-430 may be repeated after step 355 (yes) and/or 423 to select another new simulating host.

In this synchronous migration (e.g., synchronous host transitioning) case, if steps 355-390 and/or messages 423-430 occur in a limited time, such as less than 1 or 2 seconds, host transitioning may be seamless and instead of hosts 130-150 pausing and displaying a screen overlay, they may display an onscreen message (rather than an overlay) and allow the game to continue (rather than pause) in some semi-meaningful way.

It is noted that any number of messages 423, 425, 427 and/or 428 can be one of messages 125.

In some cases, only steps 310-350 are performed. In some cases, steps 355-390 are performed with steps. In some cases, step 310 is omitted.

Figure 5:
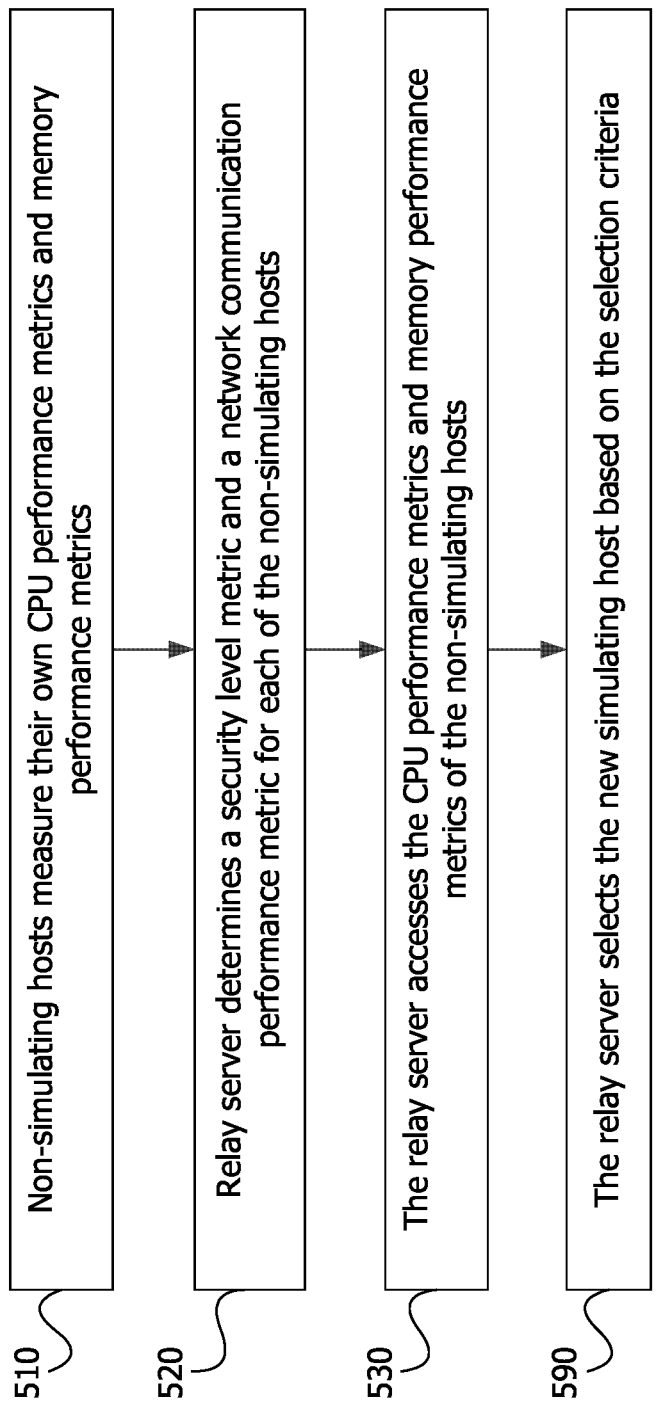
FIG. 5 is a flowchart of a process flow for selecting a non-simulating host to be a new simulating host.
Figure 6:
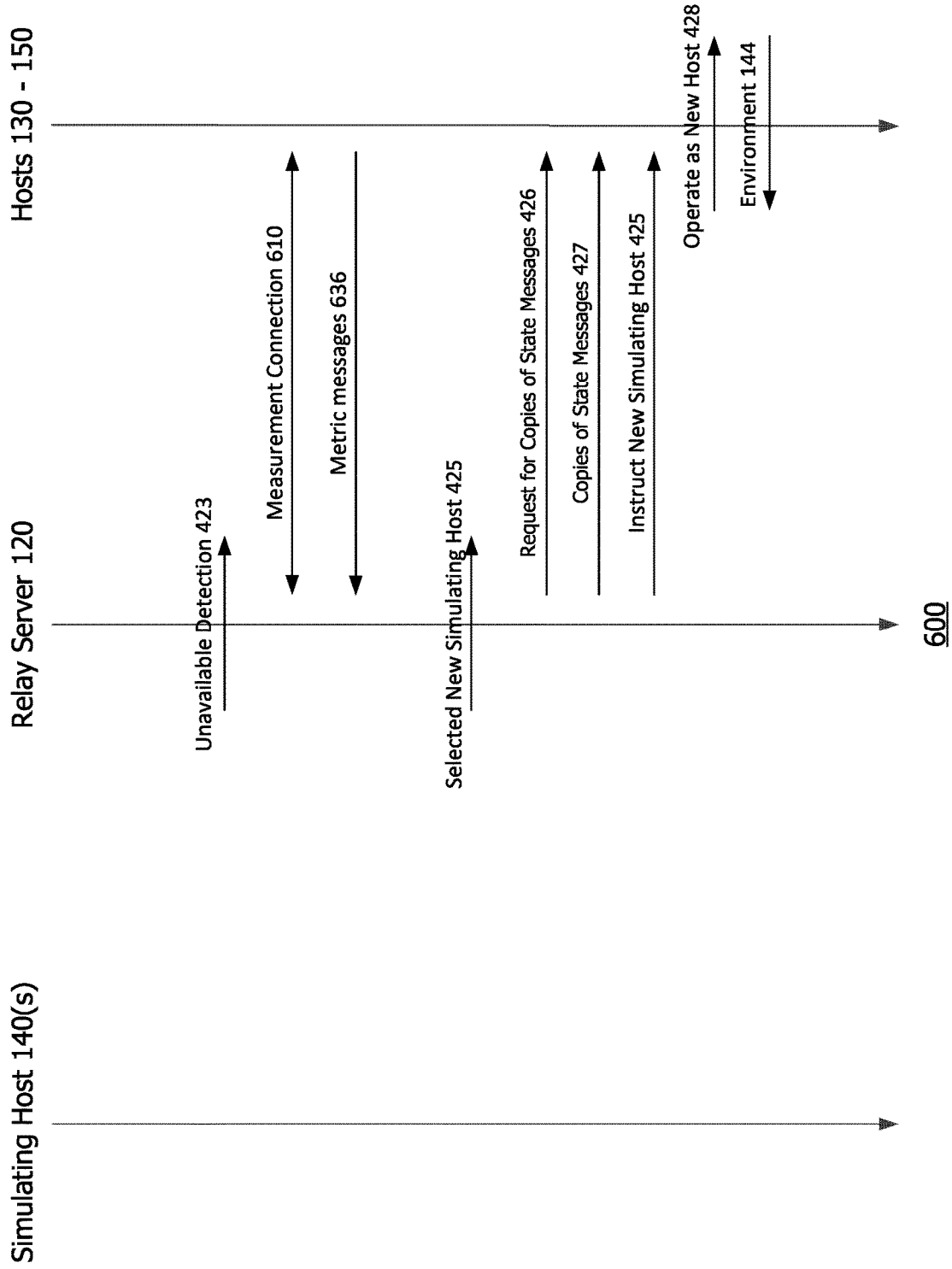
FIG. 6 is a signal flow diagram for selecting a non-simulating host to be a new simulating host.

FIG. 5 is a flowchart of a process flow 500 for selecting a non-simulating host of hosts 130-150 to be a new simulating host 180. Flow 500 may be or be part of step 360. FIG. 6 is signal flow diagram 600 for selecting a non-simulating host of hosts 130-150 to be a new simulating host 180. Flow 600 may be or be part of message 425.

The flow 500 and/or flow 600 may be performed by a relay server 120 for selecting a new simulating host 180 of an interactive environment 100 or 102. The flow 500 and/or flow 600 may be performed by server 120, system 100 and/or system 102. The process flow 500 has both a start step 510 and an end step 590, but the process may be cyclical in nature, such as by returning to step 510 after step 590, such as to select a different or additional new simulating host. Certain steps may not be shown in the flow 500 and/or 600. The actions, connections, messages, information, etc. described and sent and received in flow 500 may be shown in flow 600. Many of the messages in FIG. 6 are similar or identical to those in FIG. 4. These will not be re-discussed here.

At the start, the process begins with step 510 at which the (e.g., one, two or more of) non-simulating hosts 130-150 measure or test their own CPU performance metrics and memory performance metrics. The CPU performance metrics may include one or more of their CPU's speed, instruction executed per second, CPU Usage (%), CPU Clock Speed/Frequency (Mhz), Power Consumption (watts) and/or Temperature (C). The memory performance metrics may include one or more of their own RAM's speed, latency, bandwidth, number of bytes data written and/or read per second. Other metrics can include CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

Step 510 may be the non-simulating hosts 130-150 measuring their own overall computer performance such as the following metrics: short response time for a given piece of work, high throughput (rate of processing work), low utilization of computing resource(s), fast (or highly compact) data compression and decompression, high availability of the computing system or application, high bandwidth and/or short data transmission time. These computer performance metrics (things to measure) may include availability, response time, channel capacity, latency, completion time, service time, bandwidth, throughput, relative efficiency, scalability, performance per watt, compression ratio, instruction path length and speed up.

Next at step 520, the relay server 120 determines a security level metric and a network communication performance metric for each of the (e.g., one, two or more of) non-simulating hosts 130-150. The security level metric may include one or more of the vulnerable host percentage (VHP), common vulnerability scoring system (CVSS) severity score, compromised host percentage (CHP), number of attack paths, the average length of attack paths and/or the shortest attack path. The network communication performance metric may include one or more of network communication speed, bandwidth, data rate, and or latency.

Determining the security level metric and a network communication performance metric for each of the hosts at step 520 may include measuring those metrics over or using measurement connection 610 between the server 120 and the hosts non-simulating hosts 130-150. The measurement connection 610 messages (FIG. 6) are sent, and responded to with metric messages 636 by each candidate new simulating host.

At step 530, the relay server 120 accesses the CPU performance metrics and memory performance metrics of the non-simulating hosts 130-150, such as during a startup sequence for the environment 144 or at another time.

Accesses the CPU performance metrics and memory performance metrics at step 530 may include requesting and receiving metric messages 636 having those metrics from the hosts non-simulating hosts 130-150.

Next, at step 590, the relay server 120 (e.g., selector 121) selects the new simulating host 180 based on at least two of the selection criteria. The selection criteria may be or include: the security level metrics, the network communication performance metrics, the CPU performance metrics and the RAM memory performance metrics of the at least two non-simulating hosts. Selecting at step 590 may include selecting the new simulating host 180 as the one of non-simulating hosts 130-150 having the highest average of the at least two metrics.

Selecting at step 590 may include comparing at least two selection criteria or metrics with a metric rating system; and selecting the new host as a non-simulating host having a highest average of the ratings of the rating system. A number of metrics or characteristics may be taken into account simultaneously such that each of the potential candidate new simulating hosts may be objectively compared. The metrics may each be given a weight in such a system with an overall score generated thereby using the weight of each characteristic or metric considered and summed. In such a way, an objective best of the candidate new simulating hosts may be selected as the new simulating host. In some cases, it may be impossible for a non-simulating host to meet the objective standards for a given game type or interactive experience. In such cases, a traditional server may be selected as the new simulating host.

Selecting at step 590 may include selecting by and/or descriptions of selector 121 as noted herein. It may include selecting by and/or descriptions of step 360 and/or message 425.

At 590 relay server 120 (e.g., selector 121) may send a message 125 or 425 to inform the host 180 that it needs to now take control of simulating and act as unavailable host 140 was acting.

In some cases, step 510 is not performed or is performed by the server 120 determining or measuring the metrics mentioned at step 510. In some cases, only step 590 is performed.

The system described herein improves the functioning of computers by transitioning the typical server responsibilities in the server-client infrastructure to merely a relay server so that most of the load of enabling these services is offloaded to one of the clients. As a result, the relay server may serve many more clients than a typical server-client server. The improvements also include configurable distribution of game server responsibility by offloading the server responsibilities to a single client or among multiple clients. The system described herein improves the functioning of computers by dynamically transitioning of a simulating host of a portion or all of network interactive environments. In essence, the present system improves the functioning of the server system for interactive environments like those described herein by easing transition between an original and a new simulating client computing device host. The dynamic transition may occur automatically without any user input or receiving any control information. In the past, when a server or player client computer that is the game simulating host becomes unavailable, the game is discontinued. The present system streamlines a process enabling seamless transition between an original and a new client host so that a server host is not needed. These improvements reduce expenses associated with server purchase, maintenance, computing power, computing electrical power, computer cooling and communication needs.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A network architecture for an interactive environment, the network architecture comprising:
    a relay server connected through a computer network between an original simulating host and at least two non-simulating hosts engaged in co-activity within the interactive environment, the relay server for:
    receiving control information from the original simulating host and the at least two non-simulating host;
    relaying state information for the interactive environment from the simulating host to the at least two non-simulating hosts;
    detecting an unavailability of the original simulating host;
    selecting one of the at least two non-simulating host to become a new simulating host using a selection criteria;
    transmitting a copy of the state information to the new simulating host; and
    instructing the new simulating host to begin operating as the new simulating host based on the transmitted state information.

2. The network architecture of claim 1 further comprising the new simulating host, the new simulating host for:
    simulating the interactive environment based on the control information and the state information;
    storing and updating the state information based on the interactive environment; and
    communicating state messages having the state information to the relay server for the relay server to update any connected non-simulating host with changes of status to the interactive environment.

3. The network architecture of claim 2 wherein the simulating host is for simulating a portion or all of the interactive environment; and
    wherein each non-simulating host is further for:
    receiving the state information from the relay server; and
    updating the interactive environment, as shown on a display associated with each non-simulating host to correspond to the changes in the state information.

4. The network architecture of claim 1 wherein the unavailability of the original host is a selected one of: the original host disconnected from the at least two non-simulating hosts, a selected interactive environment, experience or game type requires different host parameters than the original host can provide, the original host has left the interactive environment, and the original host has selected to engage in a different experience type than at least one of the at least two non-simulating hosts.

5. The network architecture of claim 1 wherein the state information includes at least two of character data, weapons data, and location data.

6. The network architecture of claim 1 wherein the selection criteria for a non-simulating host candidate to become the new simulating host includes a selected one or more of: CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

7. The network architecture of claim 1 wherein selecting includes:
the relay server selecting the new simulating host based on at least two of the selection criteria.

8. The network architecture of claim 1 wherein each of the at least two non-simulating host receives and stores a sub-portion of the state information for the interactive environment on a periodic basis obtained through the relay server from the simulating host; and
wherein each sub-portion of the state information stored by each of the at least two non-simulating host may be combined to recreate the state information for the interactive environment in the event that the simulating host becomes unavailable.

9. The network architecture of claim 8 wherein the relay server:
upon selecting one of the at least two non-simulating host to become a new simulating host, requests copies of each sub-portion of the state information stored by each of the at least two non-simulating host;
transmits the copies of each sub-portion of the state information to the new simulating host; and
instructs the new simulating host to recreate the state information and to begin operating as the new simulating host.

10. The network architecture of claim 1 wherein the relay server:
detects the unavailability by determining that no state message has been received for a threshold period of time;
upon detecting the unavailability, sends messages to the at least two non-simulating hosts of the unavailability of the simulating host; and
upon selecting the new simulating host, sends messages to the at least two non-simulating hosts identifying the selected new simulating host.

11. The network architecture of claim 1 wherein the new simulated host is a client computer or a server computer, and wherein the new simulated host is for:
storing and updating the state information for the interactive environment;
communicating state messages having the state information to the relay server for the relay server to update the at least two non-simulating host with the changes of status to the interactive environment.

12. The network architecture of claim 1 wherein the relay server:
receives and stores periodic updates of the state information from the original simulating host; and
buffers and sends to the new simulating host, any state messages that were unacknowledged as received by the original simulating host.

13. The network architecture of claim 1 wherein the relay server is connected through a computer network to the original simulating host and at least two non-simulating hosts before detecting an unavailability of the original simulating host, and is connected through the computer network to the new simulating host and the at least two non-simulating hosts after instructing the new simulating host; and
wherein the original simulating host and the new simulating host each act as a network controller managing communication between the relay server and the non-simulating hosts.

14. The network architecture of claim 1 wherein instructing the new simulating host comprises instructing the new simulating host to:
simulate the interactive environment based on the control information;
store and update the state information based on changes to the interactive environment;
communicate state messages having the state information to the relay server for the relay server to update the at least two non-simulating host with the changes of status to the interactive environment.

15. The network architecture of claim 1 wherein:
the relay server is hosted by a game or experience provider;
the original simulating host is a host player-operated client computer serving as a server;
the non-simulating hosts are non-simulating client computers participating in the game or experience and connected, via the relay server, to the host client computer;
the original simulating host handles all game logic, including simulating in-game avatar movement, health, shooting, and actions; and
by default, if the original simulating host disconnects, the interactive environment will end for all connected non-simulating hosts as well when the state information is not shared by the relay server or the non-simulating client computers.

16. The network architecture of claim 1 wherein the network architecture includes an apparatus having a non-transitory machine readable medium storing a program having instructions which when executed by a processor will cause the processor to dynamically transition a simulating host of a portion or all of network interactive environments as claimed in claim.

17. A relay server for dynamic transitioning from an original to a new simulating host of an interactive environment, the relay server for:
connecting through a computer network between the original simulating host and at least two non-simulating hosts engaged in co-activity within the interactive environment;
receiving user input control information from the at least two non-simulating host;
sending the received user input control information to the original simulating host;
receiving state messages having the state information having changes of status to the interactive environment from the original simulating host based on the user input control information from the at least two non-simulating host and user input control information of the original simulating host;
updating the at least two non-simulating hosts with the state messages;
detecting an unavailability of the original simulating host;

selecting one of the at least two non-simulating host to become a new simulating host based on at least three selection criteria;

transmitting the state information to the new simulating host; and instructing the new simulating host to begin operating as the new simulating host based on the transmitted state information.

18. The network architecture of claim 17 wherein the selection criteria include: CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

19. The relay server of claim 17, wherein instructing the new simulating host comprises instructing the new simulating host to:

simulate the interactive environment based on the user input control information from the at least two non-simulating host and user input control information of the new simulating host, from the new simulating host;

store and update the state information based on the interactive environment;

communicate state messages having the state information to the relay server for the relay server to update the at least two non-simulating host with the changes of status to the interactive environment.

20. The relay server of claim 17, wherein the relay server is part of a network architecture further comprising:

the original simulating host for:

simulating a portion or all of the interactive environment based on the control information;

storing and updating the state information based on the interactive environment;

communicating state messages having the state information to the relay server for the relay server to update the at least two non-simulating host with the changes of status to the interactive environment;

the at least two non-simulating host for:

receiving the state messages from the relay server; and updating the interactive environment, as shown on a display associated with the at least two non-simulating host to correspond to the changes of status.

21. A method for operation of a relay server for dynamic transitioning from an original to a new simulating host of an interactive environment, the method for the relay server comprising:

connecting through a computer network to the original simulating host and at least two non-simulating hosts engaged in co-activity within the interactive environment;

receiving user input control information from the at least two non-simulating host;

sending the received user input control information to the original simulating host;

receiving state messages having the state information having changes of status to the interactive environment from the original simulating host based on the user input control information from the at least two non-simulating host and user input control information of the original simulating host;

updating the at least two non-simulating hosts with the state messages;

detecting an unavailability of the original simulating host;

selecting one of the at least two non-simulating host to become a new simulating host;

transmitting the state information to the new simulating host; and instructing the new simulating host to begin operating as the new simulating host based on the transmitted state information.

22. The method of claim 21 further comprising selection of the new simulating host based upon at least one selection criteria for a candidate new simulating host selected from the group:

CPU performance, RAM memory performance, network latency, network speed, network bandwidth, a physical location, hardware security for the non-simulating host candidate, software security for the non-simulating host candidate, setting requirements for a selected interactive environment, experience, or game type set by the operator of the selected interactive environment, experience, or game type, and a number of users or avatars in the selected interactive environment, experience, or game type.

* * * * *